(12) United States Patent
Ryder

(10) Patent No.: US 8,099,350 B2
(45) Date of Patent: *Jan. 17, 2012

(54) PERSONAL OR FAMILY FINANCIAL ACCOUNTING AND MANAGEMENT SYSTEM

(75) Inventor: Lee Ryder, Franklin, TN (US)

(73) Assignee: Elaine G. Ryder, Franklin, TN (US)

( * ) Notice: Subject to any disclaimer, the term of this patent is extended or adjusted under 35 U.S.C. 154(b) by 713 days.

This patent is subject to a terminal disclaimer.

(21) Appl. No.: 12/181,087

(22) Filed: Jul. 28, 2008

(65) Prior Publication Data

US 2009/0024540 A1    Jan. 22, 2009

Related U.S. Application Data

(63) Continuation-in-part of application No. 10/112,825, filed on Mar. 29, 2002, now Pat. No. 7,421,408.

(60) Provisional application No. 60/282,064, filed on Apr. 5, 2001.

(51) Int. Cl.
*G06Q 40/00* (2006.01)
(52) U.S. Cl. .......... 705/36 R; 705/35; 705/36 T; 705/30
(58) Field of Classification Search .................. 705/35
See application file for complete search history.

(56) References Cited

U.S. PATENT DOCUMENTS

| | | |
|---|---|---|
| 5,991,744 A | 11/1999 | DiCresce |
| 7,050,997 B1 | 5/2006 | Wood, Jr. |
| 2002/0103733 A1 | 8/2002 | Barrington et al. |
| 2002/0156710 A1 | 10/2002 | Ryder |

OTHER PUBLICATIONS

Heckerman, Donald A., "Financial Modeling: A Powerful Tool for Planing and Decision Suport", Managerial Planing, v30md, p. 21-25Mar./Apr. 1982.
www.adviceamerica.com, Copyright 1999, printed Jun. 27, 2002, 10 pages.

*Primary Examiner* — Kirsten Apple
(74) *Attorney, Agent, or Firm* — Larson Newman, LLP

(57) ABSTRACT

A method for determining a state of personal finances includes establishing a personal finance code. The personal finance code includes amounts associated with a set of sources of income and amounts associated with a set of uses of funds. The personal finance code includes amounts associated with a set of asset categories. The set of asset categories include income producing assets, income consuming assets, and non-producing income producing assets. The method also includes determining a set of guidelines associated with the personal finance code. The set of guidelines is associated with at least one time period. In addition, the method includes deriving a comparison between the set of guidelines and a set of fiscal behaviors. The set of fiscal behaviors is associated with the at least one time period. The method further includes projecting the comparison over at least one subsequent time period to determine a projected effect. The projected effect includes a relative valuation of assets in at least one of the set of asset categories.

23 Claims, 28 Drawing Sheets

| ASSET CLASS AS % TOTAL ASSETS + L | 12/31/93 | 12/31/94 | 12/31/95 | 12/31/96 | 12/31/97 | 12/31/98 | 6/30/99 | 12/31/99 | 4/30/00 | 12/31/00 |
|---|---|---|---|---|---|---|---|---|---|---|
| IPA | 83.33% | 65.44% | 67.78% | 68.81% | 97.46% | 83.03% | 83.50% | 82.00% | 81.05% | 82.00% |
| NPIPA | 3.83% | 3.47% | 2.48% | 2.46% | 0.54% | 0.03% | 0.00% | 0.00% | 0.00% | 0.00% |
| ICA+L | 9.68% | 28.13% | 26.80% | 25.78% | 0.84% | 12.65% | 12.50% | 13.75% | 14.00% | 13.50% |
| NA | 3.15% | 3.04% | 2.94% | 2.92% | 1.16% | 4.28% | 4.00% | 4.25% | 4.95% | 4.50% |

| L | 0.00% | 6.81% | 6.31% | 5.57% | 0.00% | 0.00% | 0.00% | 0.50% | 0.50% | 0.00% |
|---|---|---|---|---|---|---|---|---|---|---|

FIG. 8

|  | ANNUAL | MONTHLY |
|---|---|---|
| SALARY | | |
| SOURCE-N | | |
| NEW DEBT | | |
| RETIREMENT | | |
| SALE ASSET | | |
| INVESTMENT REFERENCE | | |
| TOTAL | | |
| CASH | | |

|  | ANNUAL | MONTHLY |
|---|---|---|
| U1 | | |
| U2 | | |
| UN | | |
| TAXES | | |
| RETIREMENT | | |
| MTG INTEREST | | |
| DEBT REPAYMENT | | |
| PURCHASE ASSET | | |

FIG. 21

| ASSET TYPE | VALUE | RATE |
|---|---|---|
| A-1 | | |
| A-2 | | |
| A-3 | | |
| A-4 | | |
| A-N | | |
| TOTAL | | |

FIG. 22

| | PERIOD 1 | PERIOD 2 | PERIOD 3 | PERIOD N |
|---|---|---|---|---|
| ESTIMATE | | | | |
| ACTUAL | | | | |
| CUM. ESTIMATE | | | | |
| CUM. ACTUAL | | | | |
| BALANCE | | | | |

FIG. 23

SOURCE OF FUNDS (S)

| | Annual | Monthly |
|---|---|---|
| John Salary | 150,000 | 12,500 |
| Joan Salary | 50,000 | 4,167 |
| S-1 | 0 | 0 |
| S-2 | 0 | 0 |
| S-3 | 0 | 0 |
| S-4 | 0 | 0 |
| New Debt | 0 | 0 |
| John Deposit (401k + Emp.) | 18,500 | 1,542 |
| Joan Deposit (401k + Emp.) | 7,500 | 625 |
| John (Sale IPA) | 0 | 0 |
| Joan (Sale IPA) | 0 | 0 |
| Sale ICA: Home | 0 | 0 |
| Sale ICA: Other | 0 | 0 |
| Sale NPIPA | 0 | 0 |
| Sale NA | 0 | 0 |
| Sale EDA | 0 | 0 |
| John (Inv. Appr.) | 4,740 | 395 |
| Joan (Inv. Appr.) | 2,300 | 192 |
| Inv. Appr. EDA | 0 | 0 |
| TOTAL (S) | 233,040 | 19,420 |
| TOTAL (S) + Cash Chg | 233,029 | 11 |

X

| Total (S) | 233,040 |
|---|---|
| Total (U) | 233,051 |
| Year Spending | 226,000 |
| Year Saving | 35,942 |
| | 13.72 |

X = Saving

USE OF FUNDS (U)

| | | Annual | Monthly |
|---|---|---|---|
| | Lifestyle | 128,500 | 10,708 |
| | U-2 | 0 | 0 |
| | U-3 | 0 | 0 |
| | U-4 | 0 | 0 |
| | U-5 | 0 | 0 |
| | U-6 | 0 | 0 |
| | U-7 | 0 | 0 |
| | U-8 | 0 | 0 |
| | U-9 | 0 | 0 |
| | U-10 | 0 | 0 |
| | U-11 | 0 | 0 |
| | U-12 | 0 | 0 |
| | U-13 | 0 | 0 |
| | U-14 | 0 | 0 |
| | Federal Taxes | 60,000 | 5,000 |
| | State Taxes | 0 | 0 |
| X | John (401k + Emp.) | 18,500 | 1,542 |
| X | Joan (401k + Emp.) | 7,500 | 625 |
| | Federal Withholding | 0 | 0 |
| | Mtg. Interest | 8,598 | 716 |
| X | Debt Repayment (Home) | 2,914 | 243 |
| X | Debt Repayment (Other) | 0 | 0 |
| X | John (Purchase IPA) | 0 | 0 |
| X | Joan (Purchase IPA) | 0 | 0 |
| | Purch. IC Asset (Home) | 0 | 0 |
| | Purch. IC Asset (Other) | 0 | 0 |
| | Purchase NPIP Asset | 0 | 0 |
| | Purchase N Asset | 0 | 0 |
| X | Purchase Ed. Asset | 0 | 0 |
| X | John (Inv. Reinv.) | 4,740 | 395 |
| X | Joan (Inv. Reinv.) | 2,300 | 192 |
| X | Inv. Inc. Reinvest. ED | 0 | 0 |
| | TOTAL (U) | 233,051 | 19,421 |

ASSETS & LIABILITIES

| Year | 2007 | 2008 | 2009 | 2010 | 2011 | 2012 | 2013 | 2014 |
|---|---|---|---|---|---|---|---|---|
| John Projected | 50,000 | 73,240 | 98,339 | 125,446 | 154,722 | 186,340 | 220,487 | 257,366 | 297,195 |
| John Actual | 50,000 | 73,240 | 98,339 | 125,446 | 154,722 | 186,340 | 220,487 | 257,366 | 297,195 |
| Balance | | 0 | 0 | 0 | 0 | 0 | 0 | 0 | 0 |
| Joan Projected | 25,000 | 34,800 | 45,384 | 56,815 | 69,160 | 82,493 | 96,892 | 112,443 | 129,239 |
| Joan Actual | 25,000 | 34,800 | 45,384 | 56,815 | 69,160 | 82,493 | 96,892 | 112,443 | 129,239 |
| Balance | | 0 | 0 | 0 | 0 | 0 | 0 | 0 | 0 |
| Total IP Assets - Projected | 85,000 | 118,029 | 153,712 | 192,250 | 233,870 | 278,821 | 327,368 | 379,798 | 436,423 |
| Total IP Assets - Actual | 85,000 | 118,029 | 153,712 | 192,250 | 233,870 | 278,821 | 327,368 | 379,798 | 436,423 |
| Balance | | 0 | 0 | 0 | 0 | 0 | 0 | 0 | 0 |
| Projected | 240,000 | 240,000 | 240,000 | 240,000 | 240,000 | 240,000 | 240,000 | 240,000 |
| Actual | 240,000 | 240,000 | 240,000 | 240,000 | 240,000 | 240,000 | 240,000 | 240,000 |
| Balance | | 0 | 0 | 0 | 0 | 0 | 0 | 0 | 0 |
| Projected | 25,000 | 25,000 | 25,000 | 25,000 | 25,000 | 25,000 | 25,000 | 25,000 |
| Actual | 25,000 | 25,000 | 25,000 | 25,000 | 25,000 | 25,000 | 25,000 | 25,000 |
| Balance | | 0 | 0 | 0 | 0 | 0 | 0 | 0 | 0 |
| Projected | 0 | 0 | 0 | 0 | 0 | 0 | 0 | 0 |
| Actual | 0 | 0 | 0 | 0 | 0 | 0 | 0 | 0 |
| Balance | | 0 | 0 | 0 | 0 | 0 | 0 | 0 | 0 |
| Projected | 0 | 0 | 0 | 0 | 0 | 0 | 0 | 0 |
| Actual | 0 | 0 | 0 | 0 | 0 | 0 | 0 | 0 |
| Balance | | 0 | 0 | 0 | 0 | 0 | 0 | 0 | 0 |

LIABILITIES

| | 2007 | 2008 | 2009 | 2010 | 2011 | 2012 | 2013 | 2014 |
|---|---|---|---|---|---|---|---|---|
| Projected | 144,379 | 141,465 | 138,371 | 135,087 | 131,600 | 127,898 | 123,968 | 119,795 | 115,365 |
| Actual | 144,379 | 141,465 | 138,371 | 135,087 | 131,600 | 127,898 | 123,968 | 119,795 | 115,365 |
| Balance | | 0 | 0 | 0 | 0 | 0 | 0 | 0 | 0 |

FIG. 31

ASSETS & LIABILITIES

| | Year 0 2022 | 2023 | 2024 | 2025 | 2026 | 2027 | 2028 | 2029 | 2030 | 2031 |
|---|---|---|---|---|---|---|---|---|---|---|
| [Assets] | | | | | | | | | | |
| John Projected | 754,736 | 834,355 | 920,344 | 1,013,211 | 1,113,508 | 1,221,829 | 1,338,815 | 1,465,160 | 1,601,613 | 1,748,982 |
| John Actual | 754,736 | 834,355 | 920,344 | 1,013,211 | 1,113,508 | 1,221,829 | 1,338,815 | 1,465,160 | 1,601,613 | 1,748,982 |
| Balance | 0 | 0 | 0 | 0 | 0 | 0 | 0 | 0 | 0 | 0 |
| Joan Projected | 322,178 | 355,752 | 392,012 | 431,173 | 473,467 | 519,145 | 568,476 | 621,754 | 679,295 | 741,438 |
| Joan Actual | 322,178 | 355,752 | 392,012 | 431,173 | 473,467 | 519,145 | 568,476 | 621,754 | 679,295 | 741,438 |
| Balance | 0 | 0 | 0 | 0 | 0 | 0 | 0 | 0 | 0 | 0 |
| Total IP Assets Projected | 1,086,903 | 1,200,096 | 1,322,345 | 1,454,373 | 1,596,964 | 1,750,962 | 1,917,290 | 2,096,903 | 2,291,128 | 2,500,657 |
| Total IP Assets Actual | 1,086,903 | 1,200,096 | 1,322,345 | 1,454,373 | 1,596,964 | 1,750,962 | 1,917,290 | 2,096,903 | 2,291,128 | 2,500,657 |
| Balance | 0 | 0 | 0 | 0 | 0 | 0 | 0 | 0 | 0 | 0 |
| Projected | 240,000 | 240,000 | 240,000 | 240,000 | 240,000 | 240,000 | 240,000 | 240,000 | 240,000 | 240,000 |
| Actual | 240,000 | 240,000 | 240,000 | 240,000 | 240,000 | 240,000 | 240,000 | 240,000 | 240,000 | 240,000 |
| Balance | 0 | 0 | 0 | 0 | 0 | 0 | 0 | 0 | 0 | 0 |
| Projected | 25,000 | 25,000 | 25,000 | 25,000 | 25,000 | 25,000 | 25,000 | 25,000 | 25,000 | 25,000 |
| Actual | 25,000 | 25,000 | 25,000 | 25,000 | 25,000 | 25,000 | 25,000 | 25,000 | 25,000 | 25,000 |
| Balance | 0 | 0 | 0 | 0 | 0 | 0 | 0 | 0 | 0 | 0 |
| Projected | 0 | 0 | 0 | 0 | 0 | 0 | 0 | 0 | 0 | 0 |
| Actual | 0 | 0 | 0 | 0 | 0 | 0 | 0 | 0 | 0 | 0 |
| Balance | 0 | 0 | 0 | 0 | 0 | 0 | 0 | 0 | 0 | 0 |
| Projected | 0 | 0 | 0 | 0 | 0 | 0 | 0 | 0 | 0 | 0 |
| Actual | 0 | 0 | 0 | 0 | 0 | 0 | 0 | 0 | 0 | 0 |
| Balance | 0 | 0 | 0 | 0 | 0 | 0 | 0 | 0 | 0 | 0 |
| LIABILITIES | | | | | | | | | | |
| Projected | 68,532 | 60,940 | 52,880 | 44,323 | 35,238 | 25,592 | 15,352 | 4,480 | 0 | 0 |
| Actual | 68,532 | 60,940 | 52,880 | 44,323 | 35,238 | 25,592 | 15,352 | 4,480 | 0 | 0 |
| Balance | 0 | 0 | 0 | 0 | 0 | 0 | 0 | 0 | 0 | 0 |

FIG. 32

| A.I. as % of TOTAL BAL. | 2022 | 2023 | 2024 | 2025 | 2026 | 2027 | 2028 | 2029 | 2030 | 2031 |
|---|---|---|---|---|---|---|---|---|---|---|
| IP Assets - Projected | 76.52 | 78.64 | 80.62 | 82.46 | 84.17 | 85.77 | 87.24 | 88.61 | 89.63 | 90.42 |
| IP Assets - Actual | 76.52 | 78.64 | 80.62 | 82.46 | 84.17 | 85.77 | 87.24 | 88.61 | 89.63 | 90.42 |
| IC + Liabilities - Projected | 21.72 | 19.72 | 17.86 | 16.12 | 14.51 | 13.01 | 11.62 | 10.33 | 9.39 | 8.68 |
| IC + Liabilities - Actual | 21.72 | 19.72 | 17.86 | 16.12 | 14.51 | 13.01 | 11.62 | 10.33 | 9.39 | 8.68 |
| Neutral - Projected | 1.76 | 1.64 | 1.52 | 1.42 | 1.32 | 1.22 | 1.14 | 1.06 | 0.98 | 0.90 |
| Neutral - Actual | 1.76 | 1.64 | 1.52 | 1.42 | 1.32 | 1.22 | 1.14 | 1.06 | 0.98 | 0.90 |
| NPIP - Projected | 0.00 | 0.00 | 0.00 | 0.00 | 0.00 | 0.00 | 0.00 | 0.00 | 0.00 | 0.00 |
| NPIP - Actual | 0.00 | 0.00 | 0.00 | 0.00 | 0.00 | 0.00 | 0.00 | 0.00 | 0.00 | 0.00 |

S & U
Investments
Education

| | 2022 | 2023 | 2024 | 2025 | 2026 | 2027 | 2028 | 2029 | 2030 | 2031 |
|---|---|---|---|---|---|---|---|---|---|---|
| Projected | 1,283,371 | 1,404,156 | 1,534,464 | 1,675,050 | 1,826,726 | 1,990,369 | 2,166,928 | 2,357,423 | 2,556,128 | 2,765,657 |
| Actual | 1,283,371 | 1,404,156 | 1,534,464 | 1,675,050 | 1,826,726 | 1,990,369 | 2,166,928 | 2,357,423 | 2,556,128 | 2,765,657 |

PROJECTED RETURN %  8.00

| | 2022 | 2023 | 2024 | 2025 | 2026 | 2027 | 2028 | 2029 | 2030 | 2031 |
|---|---|---|---|---|---|---|---|---|---|---|
| Projected | 86,952 | 96,008 | 105,788 | 116,350 | 127,757 | 140,077 | 153,382 | 167,752 | 183,290 | 200,053 |
| Actual | 86,952 | 96,008 | 105,788 | 116,350 | 127,757 | 140,077 | 153,382 | 167,752 | 183,290 | 200,053 |
| Balance | 0 | 0 | 0 | 0 | 0 | 0 | 0 | 0 | 0 | 0 |

FIG. 33

SOURCE OF FUNDS (S)

| | Annual | Monthly |
|---|---|---|
| Jack Salary | 0 | 0 |
| Jill Salary | 0 | 0 |
| SS | 11,556 | 963 |
| SS-C | 8,100 | 675 |
| S-3 | 0 | 0 |
| S-4 | 0 | 0 |
| New Debt | 0 | 0 |
| Jack Deposit (401k + Emp.) | 0 | 0 |
| Jill Deposit (401k + Emp.) | 123,000 | 10,250 |
| Jack (Sale IPA) | 110,000 | 9,167 |
| Jill (Sale IPA) | 0 | 0 |
| Sale ICA - Home | 0 | 0 |
| Sale ICA - Other | 0 | 0 |
| Sale NPIPA | 0 | 0 |
| Sale NA | 0 | 0 |
| Sale EDA | 0 | 0 |
| Jack (Inv. Appr.) | 163,309 | 13,609 |
| Jill (Inv. Appr.) | 184,242 | 15,354 |
| Inv. Appr. EDA | 7,235 | 603 |
| TOTAL (S) | 374,443 | 31,204 |
| TOTAL (S) + Cash Chg. | 374,439 | |

| Total (S) | 374,443 |
|---|---|
| Total (U) | 374,446 |
| Year Spending | 252,656 |
| Year Saving | 142,301 |
| | 36.03 |

USE OF FUNDS (U)

| | | Annual | Monthly |
|---|---|---|---|
| | Lifestyle | 110,000 | 9,167 |
| | Vacation | 40,000 | 3,333 |
| | Children & Grandchildren | 4,000 | 333 |
| | Medical | 17,000 | 1,417 |
| | U-5 | 0 | 0 |
| | U-6 | 0 | 0 |
| | U-7 | 0 | 0 |
| | U-8 | 0 | 0 |
| | U-9 | 0 | 0 |
| | U-10 | 0 | 0 |
| | U-11 | 0 | 0 |
| | U-12 | 0 | 0 |
| | U-13 | 0 | 0 |
| | U-14 | 0 | 0 |
| | Federal Taxes | 20,000 | 1,667 |
| | State Taxes | 4,000 | 333 |
| X | Jack (401k + Emp.) | 0 | 0 |
| X | Jill (401k + Emp.) | 0 | 0 |
| | Federal Withholding | 19,641 | 1,637 |
| | Mtg. Interest | 15,518 | 1,293 |
| X | Debt Repayment (Home) | 0 | 0 |
| X | Debt Repayment (Other) | 0 | 0 |
| X | Jack (Purchase IPA) | 0 | 0 |
| X | Jill (Purchase IPA) | 0 | 0 |
| | Purch. IC Asset (Home) | 0 | 0 |
| | Purch. IC Asset (Other) | 7,500 | 625 |
| | Purchase NPIP Asset | 5,000 | 417 |
| | Purchase N Asset | 5,000 | 417 |
| X | Purchase Ed. Asset | 0 | 0 |
| X | Jack (Inv. Inc. Reinv.) | 163,309 | 13,609 |
| X | Jill (Inv. Inc. Reinv.) | 184,242 | 15,354 |
| X | Inv. Inc. Reinvest. ED | 7,235 | 603 |
| | TOTAL (U) | 374,446 | 31,204 |

X = Saving

| INVESTMENTS: | | |
|---|---|---|
| As of 12/31/2006 | | |

| JOINT | Amount | % Return |
|---|---|---|
| Checking A/C | 10,000,000 | 0.00 |

| JACK | Amount | % Return |
|---|---|---|
| TDA | 1,450,000 | 10.00 |
| Comm Trust #1 | 150,000 | 10.00 |
| Comm Trust #2 | 93,000 | 10.00 |
| Loan | 45,000 | 0.00 |
| Total Jack | 1,738,000 | 9.74 |

| JILL | Amount | % Return |
|---|---|---|
| TDA | 1,600,000 | 10.00 |
| IRA | 85,000 | 8.00 |
| IRA Roll | 30,000 | 6.00 |
| Comm Trust | 210,000 | 10.00 |
| Total Jill | 1,925,000 | 9.85 |

| Total Investments | 3,673,000 | 9.77 |

| Education | Amount | % Return |
|---|---|---|
| TDA | 22,500 | 8.00 |
| Comm. | 52,000 | 10.00 |
| Total Education | 74,500 | 9.40 |

| | | |
|---|---|---|
| IP Assets | 3,673,000 | |
| IC Assets | 785,000 | |
| N Assets | 195,000 | |
| NPIP | 0 | |
| Liabilities | 340,101 | |
| A + L | 4,993,101 | |
| | 73.56 | |
| | 22.53 | |
| | 3.91 | |
| | 0.00 | |

| | | | 4,312,899 |
|---|---|---|---|

| ASSET DISTRIB. & LIAB | | |
|---|---|---|
| INC. PROD ASSETS | Amount | % Return |
| Joint | 10,000 | 0.00 |
| Jack | 1,738,000 | 9.74 |
| Jill | 1,925,000 | 9.85 |
| Total IP Assets | 3,673,000 | 9.77 |
| Education | 74,500 | 9.40 |

| | Amount | |
|---|---|---|
| Residence (cost) | 750,000 | 0 |
| 2nd Resid. (cost) | 0 | 0 |
| Autos (cost) | 35,000 | 0 |
| Boats, Planes (cost) | 0 | 0 |
| Country Club (Entry) | 0 | 0 |
| Other | 0 | 0 |
| Total IC Assets | 785,000 | |

| | Amount | |
|---|---|---|
| Home Furnishings | 150,000 | 0 |
| Art | 15,000 | 0 |
| Jewelry | 30,000 | 0 |
| Collectibles | 0 | 0 |
| Personal Jack | 0 | 0 |
| Personal Jill | 0 | 0 |
| Other | 0 | 0 |
| Total Neutral Assets | 195,000 | |

| | Amount | |
|---|---|---|
| Residence Appreciation | 0 | 0 |
| 2nd Res. Appreciation | 0 | 0 |
| Land | 0 | 0 |
| Assets (Held for Invest.) | 0 | 0 |
| Other | 0 | 0 |
| Total NPIP Assets | 0 | |

| | Amount | |
|---|---|---|
| | 340,101 | 0 |
| | 0 | 0 |
| Total Liabilities | 340,101 | |

| A s s e t s @ TOTAL [ALL] | 2007 | 2008 | 2009 | 2010 | 2011 | 2012 | 2013 | 2014 | 2015 | 2016 |
|---|---|---|---|---|---|---|---|---|---|---|
| IP Assets - Projected | 73.56 | 74.13 | 74.73 | 75.38 | 76.07 | 76.80 | 77.56 | 78.36 | 79.20 | 80.06 | 80.95 |
| IP Assets - Actual | 73.56 | 74.13 | 74.73 | 75.38 | 76.07 | 76.80 | 77.56 | 78.36 | 79.20 | 80.06 | 80.95 |
| IC + Liabilities - Projected | 22.53 | 21.86 | 21.16 | 20.43 | 19.68 | 18.90 | 18.09 | 17.27 | 16.42 | 15.57 | 14.70 |
| IC + Liabilities - Actual | 22.53 | 21.86 | 21.16 | 20.43 | 19.68 | 18.90 | 18.09 | 17.27 | 16.42 | 15.57 | 14.70 |
| Neutral - Projected | 3.91 | 3.91 | 3.91 | 3.91 | 3.89 | 3.87 | 3.83 | 3.79 | 3.74 | 3.68 | 3.62 |
| Neutral - Actual | 3.91 | 3.91 | 3.91 | 3.91 | 3.89 | 3.87 | 3.83 | 3.79 | 3.74 | 3.68 | 3.62 |
| NPIP - Projected | 0.00 | 0.10 | 0.19 | 0.28 | 0.36 | 0.44 | 0.51 | 0.58 | 0.64 | 0.69 | 0.74 |
| NPIP - Actual | 0.00 | 0.10 | 0.19 | 0.28 | 0.36 | 0.44 | 0.51 | 0.58 | 0.64 | 0.69 | 0.74 |

| | 2007 | 2008 | 2009 | 2010 | 2011 | 2012 | 2013 | 2014 | 2015 | 2016 |
|---|---|---|---|---|---|---|---|---|---|---|
| S & U | 0 | | | | | | | | | |
| Investments | 0 | | | | | | | | | |
| Education | 0 | | | | | | | | | |
| Projected | 4,312,899 | 4,460,406 | 4,620,085 | 4,793,093 | 4,980,700 | 5,184,297 | 5,405,413 | 5,645,720 | 5,907,055 | 6,191,431 | 6,501,055 |
| Actual | 4,312,899 | 4,460,406 | 4,620,085 | 4,793,093 | 4,980,700 | 5,184,297 | 5,405,413 | 5,645,720 | 5,907,055 | 6,191,431 | 6,501,055 |

RETIREMENT

PROJECTED RETURN % 7.00 %

| | 2007 | 2008 | 2009 | 2010 | 2011 | 2012 | 2013 | 2014 | 2015 | 2016 |
|---|---|---|---|---|---|---|---|---|---|---|
| Projected | 257,110 | 265,124 | 273,925 | 283,589 | 294,202 | 305,855 | 318,652 | 332,705 | 348,136 | 365,081 | 383,689 |
| Actual | 257,110 | 265,124 | 273,925 | 283,589 | 294,202 | 305,855 | 318,652 | 332,705 | 348,136 | 365,081 | 383,689 |
| Balance | 0 | 0 | 0 | 0 | 0 | 0 | 0 | 0 | 0 | 0 | 0 |

FIG. 36

| SOURCE OF FUNDS (S) | Annual | Monthly |
|---|---|---|
| Ralph Salary | 0 | 0 |
| Rose Salary | 0 | 0 |
| Social Security | 11,000 | 917 |
| S-2 | 0 | 0 |
| S-3 | 0 | 0 |
| S-4 | 0 | 0 |
| New Debt | 0 | 0 |
| Ralph Deposit (401k + Emp.) | 0 | 0 |
| Rose Deposit (401k + Emp.) | 95,000 | 7,917 |
| Ralph (Sale IPA) | 0 | 0 |
| Rose (Sale IPA) | 7,000 | 583 |
| Sale ICA - Home | 0 | 0 |
| Sale ICA - Other | 0 | 0 |
| Sale NPIPA | 0 | 0 |
| Sale NA | 0 | 0 |
| Sale EDA | 0 | 0 |
| Ralph (Inv. Appr.) | 97,643 | 8,137 |
| Rose (Inv. Appr.) | 5,216 | 435 |
| Inv. Appr. EDA | 0 | 0 |
| TOTAL (S) | 113,859 | 9,488 |
| TOTAL (S) + Cash Chg. | 113,831 | 33 |

| | |
|---|---|
| Total (S) | 113,859 |
| Total (U) | 113,826 |
| Year Spending | 113,000 |
| Year Saving | 2,935 |
| % Saving | 2.53 |

X = Saving

| USE OF FUNDS (U) | | Annual | Monthly |
|---|---|---|---|
| | Lifestyle | 40,000 | 3,333 |
| | Medical | 10,000 | 833 |
| | Vacation | 15,000 | 1,250 |
| | Gifts & Charity | 3,000 | 250 |
| | Misc. | 1,400 | 117 |
| | Golf | 3,600 | 300 |
| | U-7 | 0 | 0 |
| | U-8 | 0 | 0 |
| | U-9 | 0 | 0 |
| | U-10 | 0 | 0 |
| | U-11 | 0 | 0 |
| | U-12 | 0 | 0 |
| | U-13 | 0 | 0 |
| | U-14 | 0 | 0 |
| | Federal Taxes | 18,000 | 1,500 |
| | State Taxes | 0 | 0 |
| X | Ralph (401k + Emp.) | 0 | 0 |
| X | Rose (401k + Emp.) | 0 | 0 |
| | Federal Withholding | 0 | 0 |
| | Mtg. Interest | 13,924 | 1,160 |
| X | Debt Repayment (Home) | 2,044 | 170 |
| X | Debt Repayment (Other) | 0 | 0 |
| X | Ralph (Purchase IPA) | 0 | 0 |
| X | Rose (Purchase IPA) | 0 | 0 |
| | Purch. IC Asset (Home) | 0 | 0 |
| | Purch. IC Asset (Other) | 6,000 | 500 |
| | Purchase NPIP Asset | 0 | 0 |
| | Purchase N Asset | 0 | 0 |
| X | Purchase Ed. Asset | 0 | 0 |
| X | Ralph (Inv. Inc. Reinv.) | 97,643 | 8,137 |
| X | Rose (Inv. Inc. Reinv.) | 5,216 | 435 |
| X | Inv. Inc. Reinvest - ED | 0 | 0 |
| | TOTAL (U) | 113,826 | 9,486 |

FIG. 37

| A & L as % of TOTAL (A&L) | 2006 | 2007 | 2008 | 2009 | 2010 | 2011 | 2012 | 2013 | 2014 | 2015 |
|---|---|---|---|---|---|---|---|---|---|---|
| IP Assets - Projected | 62.10 | 61.91 | 61.83 | 61.75 | 61.69 | 61.63 | 61.58 | 61.54 | 61.52 | 61.50 |
| IP Assets - Actual | 62.10 | 61.91 | 61.83 | 61.75 | 61.69 | 61.63 | 61.58 | 61.54 | 61.52 | 61.50 |
| IC + Liabilities - Projected | 36.30 | 36.39 | 36.49 | 36.57 | 36.65 | 36.72 | 36.78 | 36.83 | 36.87 | 36.90 | 36.92 |
| IC + Liabilities - Actual | 36.30 | 36.39 | 36.49 | 36.57 | 36.65 | 36.72 | 36.78 | 36.83 | 36.87 | 36.90 | 36.92 |
| Neutral - Projected | 1.61 | 1.60 | 1.60 | 1.59 | 1.59 | 1.59 | 1.58 | 1.58 | 1.58 | 1.57 |
| Neutral - Actual | 1.61 | 1.60 | 1.60 | 1.59 | 1.59 | 1.59 | 1.58 | 1.58 | 1.58 | 1.57 |
| NPIP - Projected | 0.00 | 0.00 | 0.00 | 0.00 | 0.00 | 0.00 | 0.00 | 0.00 | 0.00 | 0.00 |
| NPIP - Actual | 0.00 | 0.00 | 0.00 | 0.00 | 0.00 | 0.00 | 0.00 | 0.00 | 0.00 | 0.00 |

PERSONAL PROFIT

| | 2006 | 2007 | | | | | | | | |
|---|---|---|---|---|---|---|---|---|---|---|
| S & U | 0 | 0 | | | | | | | | |
| Investments | 0 | 0 | | | | | | | | |
| Education | 0 | 0 | | | | | | | | |

NET WORTH

| | 2006 | 2007 | 2008 | 2009 | 2010 | 2011 | 2012 | 2013 | 2014 | 2015 |
|---|---|---|---|---|---|---|---|---|---|---|
| Projected | 1,776,329 | 1,795,356 | 1,794,619 | 1,804,174 | 1,814,047 | 1,824,254 | 1,834,854 | 1,845,849 | 1,857,282 | 1,869,192 | 1,881,618 |
| Actual | 1,776,329 | 1,795,356 | 1,794,619 | 1,804,174 | 1,814,047 | 1,824,254 | 1,834,854 | 1,845,849 | 1,857,282 | 1,869,192 | 1,881,618 |

RETIREMENT

PROJECTED RETURN %: 7.93 %

RETIREMENT INCOME

| | 2006 | 2007 | 2008 | 2009 | 2010 | 2011 | 2012 | 2013 | 2014 | 2015 |
|---|---|---|---|---|---|---|---|---|---|---|
| Projected | 107,079 | 107,157 | 107,242 | 107,336 | 107,445 | 107,565 | 107,699 | 107,849 | 108,016 | 108,201 | 108,407 |
| Actual | 107,079 | 107,157 | 107,242 | 107,336 | 107,445 | 107,565 | 107,699 | 107,849 | 108,016 | 108,201 | 108,407 |
| Balance | 0 | 0 | 0 | 0 | 0 | 0 | 0 | 0 | 0 | 0 | 0 |

PERSONAL OR FAMILY FINANCIAL ACCOUNTING AND MANAGEMENT SYSTEM

CROSS-REFERENCE TO RELATED APPLICATION(S)

This application claims priority of and is a continuation-in-part of U.S. patent application Ser. No. 10/112,825, filed Mar. 29, 2002 entitled "A PERSONAL OR FAMILY FINANCIAL ACCOUNTING AND MANAGEMENT SYSTEM," naming Lee Ryder as an inventor, which claims priority and is a non-provisional of U.S. Provisional Application Ser. No. 60/282,064, filed Apr. 5, 2001 entitled "METHOD AND SYSTEM FOR ESTABLISHING AND COMPLYING WITH A PERSONAL FINANCIAL CODE," naming Lee Ryder as an inventor, each of which are incorporated herein by reference in their entirety.

FIELD OF THE DISCLOSURE

The present disclosure generally relates to a personal financial management system. In particular, the present disclosure relates to a method and system for determining the state of an individual's finances, establishing a personal finance code or projecting the effect of fiscal decisions or behaviors.

BACKGROUND

Businesses use profit, generally the difference between income and expenses, as a quantified unit of measure representing the state of a businesses, and thus, profit represents a motivating factor for fiscal decisions within a business context. Profit is often distributed to the owners or investors and thus, often leaves the pool of funds attributed to the business. For the purpose of discussion, reinvestment of income, i.e., the purchase of an asset, is treated as an expense. In addition, profit can be used to develop management and accounting systems and can be used to evaluate a business for investment purposes.

However, people do not have a profit motive. In contrast to businesses, people make fiscal choices based on personal goals and desires. Prior systems attempt to evaluate the fiscal state of individuals using business accounting principles, often substituting savings for profit. For the individual, income and expenses are derived from a lifetime pool of funds and the difference does not represent a profit-like measure that can be distributed to an outside entity. Moreover, savings by itself does not motivate most individual's behavior. Absent a unit of measure, conventional personal management systems fail to quantify the effect of fiscal choices on personal goals and desires and fail to provide a way for individuals to evaluate the state of their finances.

As such, a new system for evaluating the finances of an individual would be desirable.

BRIEF DESCRIPTION OF THE DRAWINGS

The present disclosure may be better understood, and its numerous features and advantages made apparent to those skilled in the art by referencing the accompanying drawings.

FIG. 8 includes a tabular graphic depicting an exemplary embodiment of a periodic assessment and reallocation of assets, according to FIG. 7.

FIG. 21 includes a block diagram of an exemplary embodiment of an entry table.

FIG. 22 includes a block diagram of an exemplary embodiment of an entry table.

FIG. 23 includes a block diagram of an exemplary embodiment of a table.

FIGS. 29, 30, 31, 32, 33, 34, 35, 36, 37, 38, and 39 include illustrations of exemplary interfaces associated with an exemplary personal financial management system.

The use of the same reference symbols in different drawings indicates similar or identical items.

DESCRIPTION OF THE EMBODIMENTS

While businesses use profit as a quantified measure of a businesses fiscal state, the fiscal principles associated individual financial management do not result in a profit that can be used to evaluate the fiscal state of an individual. Instead, it has been discovered that for an individual, income equals expenses both for a given time period and over the limited life of the individual as discussed in more detail below. Thus, profit (i.e., income minus expenses) is zero. This realization has resulted in the development of a system for evaluating the state of personal finance for an individual and evaluating the effect of fiscal behaviors on the state of personal finance.

Figure 27:
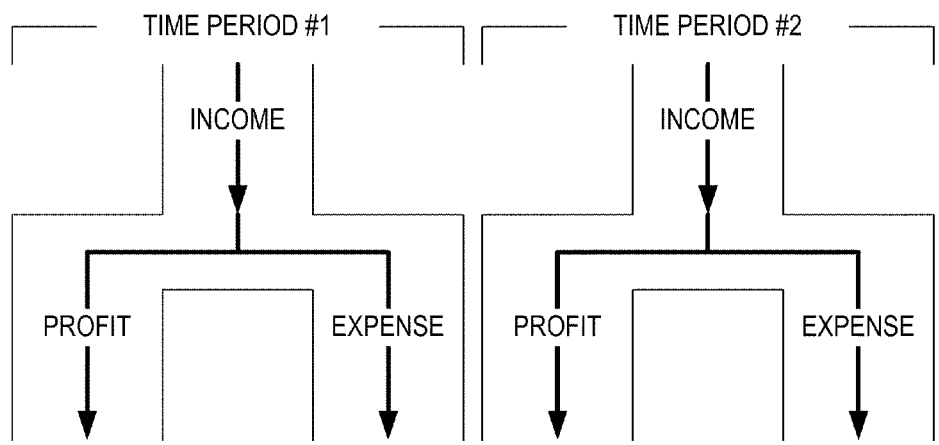
FIGS. 27 and 28 include illustrations of the flow of moneys for business and individuals respectively.

Businesses use profit (income minus expenses) as a quantified unit of measure. As illustrated in FIG. 27, a business has income derived, for example, from the sale of services or products, from leasing assets, or from borrowing, among other sources. A portion of the income is allocated to expenses, such as payment of debt, employee expenses, raw material costs, or rent, among other expenses. For the purpose of discussion, the reinvestment of income, i.e., the purchase of an asset, is considered an expense. The difference between income and expenses is defined herein as profit.

Profit is often distributed to the owners or investors of the business. Corporations may establish a dividend and distribute profits accordingly. While it is often the practice of publicly traded corporations to establish a dividend that is paid regardless of the success of sales, any additional moneys used to pay the dividend are borrowed. Such moneys are treated herein as income.

With a quantified unit of measure such as profit, a business financial management system determines the state of the company based on how the company has performed over a previous time period or projects how the company will perform over future time periods. For example, a business may provide monthly, quarterly, or annual reports, which relate to the financial history of the business. Further, the business may predict monthly, quarterly, or annual profits for one or more future periods, providing a projection of business performance.

In addition, profit may be used in fundamental analysis to aid in determining the value of a company. For example, a stock purchaser may use profit to price ratios as a factor in deciding to purchase stock. In addition, a stock purchaser may use projected profits as a factor in the decision to buy or sell. In another example, a real estate investor may use a multiple of profit in determining a value of a rental property.

Projected profits may also be used in making operating decisions. For example, a company may weigh the decision to buy new equipment based on its projected effect on profitability, such as through reducing operating cost or increasing unit throughput. In weighing the decision, the company may estimate projected profits over one or more periods assuming the purchase of the equipment.

As such, business has a universal measure of fiscal state: profit. With this universal measure, business developed elaborate management systems. Business models, accounting systems, reports, and financial statements are built on profit. Because profit is a quantified unit of measure, it is possible to link one activity of a business with other activities of a business. As a result, businesses may determine the consequence of fiscal decisions, for example, investing in one opportunity over another based on the expected effect on future profitability.

Accounting and budgetary principles that are based on determining profit are typically used in determining the state of a business. Many typical personal accounting systems have attempted to apply such business principles to individuals, often substituting savings for profit. However, individuals are motivated by factors other than savings. To the individual, savings represents delayed spending on aspects of lifestyle, which motivate the individual. Generally, individuals do not measure their personal financial state in terms of profit or savings. Savings, defined as income minus lifestyle expenses in its simplest form, is not an intuitive motivator for individuals. Instead, individuals are motivated by desired lifestyle and associated purchases or by a feeling of security, herein defined as an individual's purpose. A confluence of the individual's purpose and that individual's fiscal state (i.e., that individual's fiscal reality), yields a vision of financial well being. The fiscal state includes an individual's present ability to spend on lifestyle and the projected ability to meet future spending expectations. Any disaccord between the individual's purpose and fiscal state yields an absence of a vision of financial well being.

In contrast to business, individuals cannot measure fiscal state using profit (i.e., income minus expenses) for a specific time period. Instead, for an individual, a positive vision of financial well being is a confluence of fiscal reality (state) and individual purpose, which includes a lifetime of desires and goals to the extent that a fiscal portion of such desires and goals can be quantified.

In this regard, it has been discovered that, for an individual, income equals expenses for each time period and over a lifetime. As such, over a lifetime, the individual has access to a lifetime pool of funds to which a lifetime of income contributes and from which a lifetime of expenses are paid. While the lifetime pool of funds is not predetermined, it is a quantifiable finite variable that constrains an individual's fiscal reality. It has further been discovered that when implemented in a model that accounts for the lifetime pool of funds, the model can include a circular reference, i.e., present fiscal behaviors influence future fiscal behaviors and desired future fiscal behaviors influence present fiscal behaviors for a positive vision of financial well being to exist.

Figure 28:
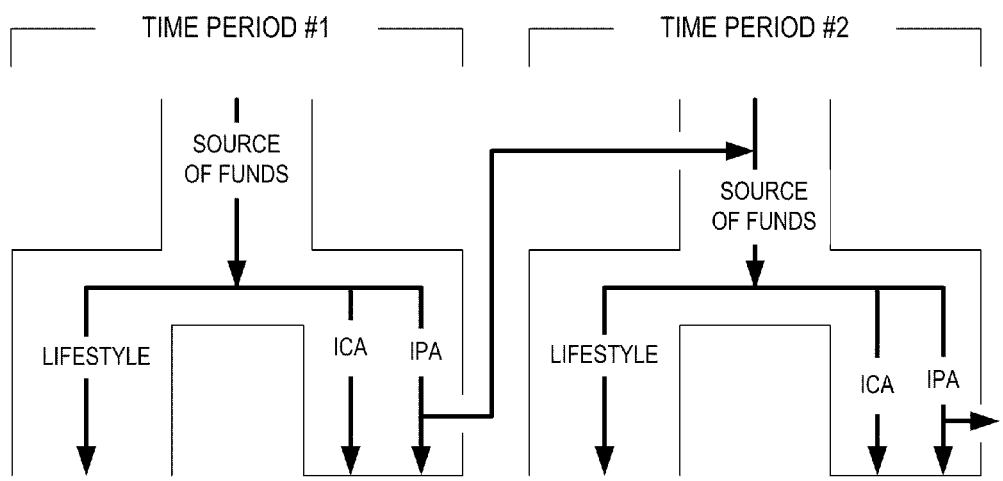

To further illustrate, FIG. 28 includes an illustration of individual finances over a set of periods. In a first period, an individual has a source of income and a set of uses for funds. As described in more detail below, the use of funds can include lifestyle uses and asset purchases. In a second period, the individual also has a source of income and a set of uses. However, the cumulative source of funds is influenced by the use of funds in the first period. In particular, when use of funds includes the purchase of an income producing asset in the first period, the source of funds in subsequent periods increases. When placed into a model that accounts for a lifetime pool of funds, the ability to make future purchases constrains the current use of funds, altering the amount of income producing assets that are to be purchased in the current time period. In another example, increasing income consuming assets and liabilities can increase expenses in subsequent time periods, constraining the availability of funds for other uses.

Further, assumptions regarding personal finance and measurements of personal financial differ from business assumptions and measurements. For example, individuals have a limited lifespan, have a limited lifetime pool of funds, can be treated as a lifetime closed system, and are motivated by individual purpose.

Individuals by virtue of their inevitable life cycle make different assumptions about lifetime and timeline than business. For example, business fiscal principles assume an infinite life, but often incorporate short-term goals. Such short-term goals are often reflected in monthly, quarterly, or annual profitability reports. Businesses typically review economics at periodic time frames, such as months, quarters, or years, but the underlying assumptions include an ongoing earned revenue sources and availability of capital through borrowing. In contrast, individuals have a limited lifetime and thus, a lifetime-limited pool of funds or earning potential. Individuals have a finite time period, which is a lifetime, and a finite number of earning years. While it is not known how long this finite time period is, it is known that the lifetime is finite and thus, earning is finite. Further, individuals tend to set longer term goals (e.g., retirement, saving for college for a dependent, etc.).

Because time is not finite to a business, revenue is not finite. Businesses typically assume an infinite lifetime, and revenue is assumed for as long as the business continues. Individuals, on the other hand, have a finite amount of money (i.e., lifetime pool of funds) that accrues to them over a lifetime. While the exact amount is not known, it is known that the amount is finite. Further, individuals may have a finite earning period that typically ends at retirement. In general, the lifetime pool of funds is a quantifiable finite quantity that while unknown, can be used to constrain a financial model.

Despite such differences between business and personal financial measurement, many typical budgetary systems for individuals attempt to apply business measurements to individuals. Often, typical systems subtract lifestyle expenses from income and denote the difference as savings, much like business systems call the difference profit. However, the individual is not a business. The difference between the purchase of lifestyle expenses and income often represents the storage of funds in a bank account or money market account, which is actually the purchase of an income producing asset. Individuals do not have a profit motive and such savings does not provide an individual insight into their fiscal state or provide a vision of financial well being.

Typically, individuals are motivated by lifestyle and projected financial goals, i.e., individual purpose. Without unusual discipline or foresight, individuals generally fail to purchase a significant number of income producing assets, as noted by recent low or negative savings rates among North Americans. Generally, perceived excess income is spent on lifestyle expenses, often to the detriment of an individual's financial purpose. Consequently, management systems constructed by business around a profit measure do not work for the individual.

Moreover, without a measure of fiscal state, many financial concepts such as debt management, tax management, investing, asset allocation, and financial planning are of little value to the average individual. To illustrate, for a business, a reduction in costs or expenses may result in increased profit. For example, a car rental company may buy rental cars cheaper from one manufacturer than another. The resulting reduction in expenses may increase profits. On the other hand, an individual may purchase a less expensive new car from one manufacturer rather than another, resulting in a larger checkbook balance. However, an increase in checkbook balance is not savings for an individual, as it often leads to increased spending in other areas without extraordinary discipline on the part of the individual. Instead, purchasing income producing assets or reducing liabilities represents savings.

Actually, savings for the individual is an increase in an income producing asset or a reduction in liability. For example, purchasing stock may be an increase in an income producing asset. Such a purchase of assets is savings. The possible return on that investment next year and the years following may further increase the value of the individual's income producing assets. Such a return is also savings if reinvested. In further contrast with business, savings for the individual has a cost as perceived by the individual. The cost may be felt as a reduction in immediate lifestyle purchases, lost opportunity to pay for other expenses, or a change in other fiscal events. Further, such a cost affects other fiscal decisions, such as retirement and college funding, and future lifestyle purchases.

Debt is another example of a business principle and practice incorrectly applied to the individual. The use of debt by business has an understandable effect on the profit measure. A business may use debt to purchase a machine to produce a product to generate a profit. In theory, a business borrows money to increase profits. In contrast, individuals generally do not borrow money to make more money. Rather, individuals often borrow money to consume or purchase income-consuming assets. Using debt to purchase a machine may directly affect the profit of the company. However, to the average individual, the use of debt does not have a clear and understandable effect on financial well-being. A little debt may seem tolerable in the short term, but the accumulation of debt is often disastrous for individuals or families, unless used to buy income producing assets under specific circumstances.

Given the differences in motivation and underlying assumptions, it is difficult for an individual to project the consequences of current actions on desired future goals. While most individuals, if asked, understand the concept of delayed gratification, they have difficulty quantifying the effect of current lifestyle choices on long-term lifestyle goals. In other words, absent the present system and methods, it is difficult to quantify the effect of current fiscal behavior on a person's vision of financial well being. Moreover, the unpredictable nature of life events often disrupts a well designed fiscal plan.

Figure 24:
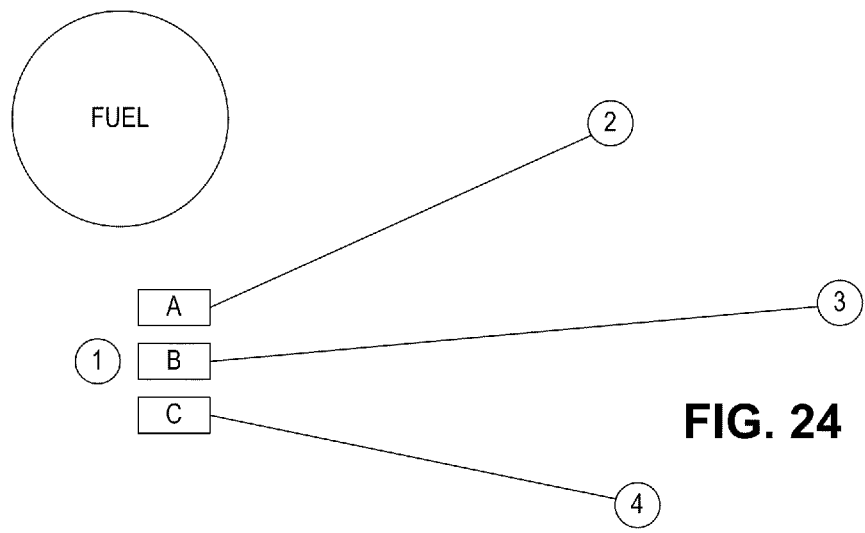
FIGS. 24, 25, and 26 include illustrations of an analogy to personal financial planning.
Figure 25:
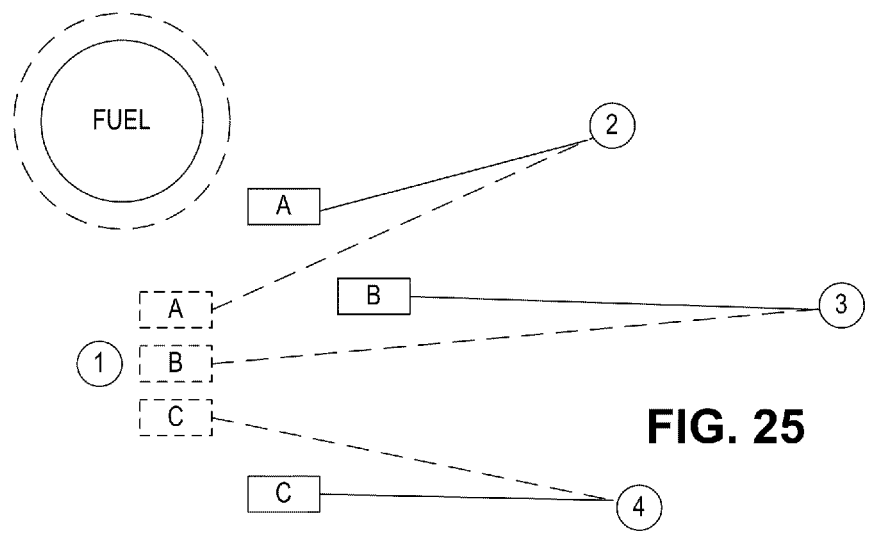
Figure 26:
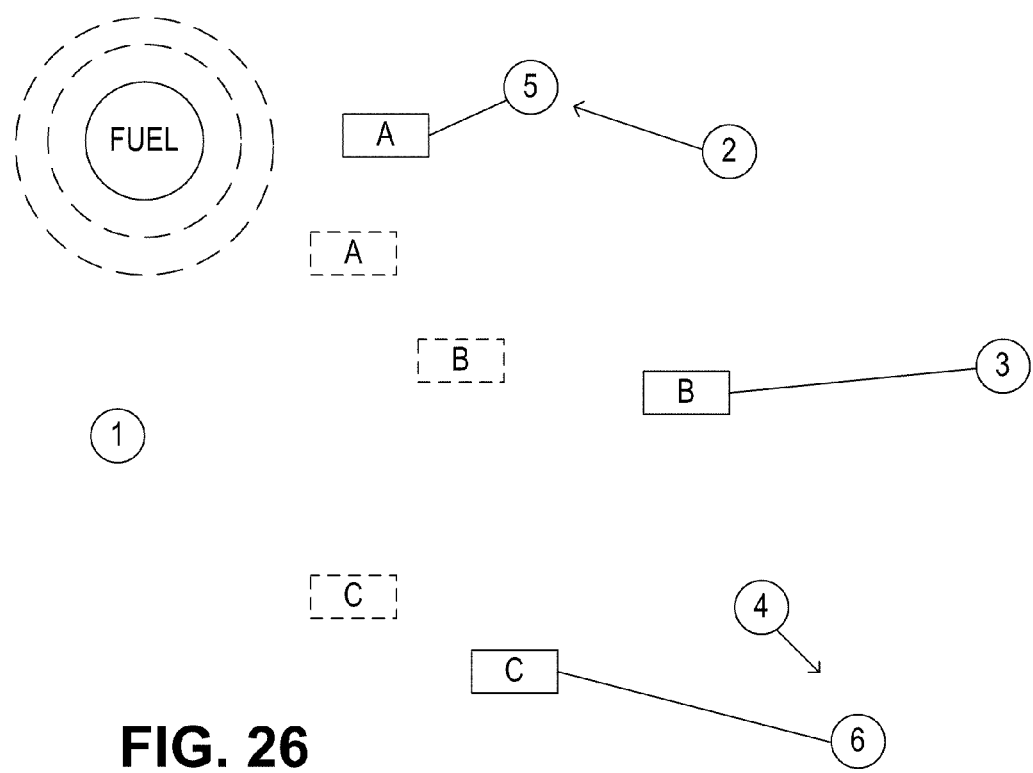

To provide an analogy, FIGS. 24, 25, and 26 illustrate proverbial ships traveling to lifestyle destinations. As illustrated at FIG. 24, ships A, B, and C are leaving location 1 for locations 2, 3, and 4. Each of the ships A, B, and C represents components of a fiscal plan that contribute to achieving a lifestyle goal. Each of the destinations (locations 2, 3, and 4) represents a lifestyle goal. While each of the lifestyle goals has a fiscal component, the lifestyle goals generally represent a component of the future lifestyle an individual would like to lead. As such, each of the proverbial destinations (locations 2, 3, and 4) represents a desired element of lifestyle, such as a European vacation, sending a child to college, or an early retirement.

After selecting their destinations, the ships A, B, and C plot a course represented by a solid line. For example, Ship A may plot a course to location 2, the Isle of Paradise Vacations. Ship B may plot a course to location 3, the Isle of Early Retirement, and ship C may plot a course to location 4, the Isle of College Tuition.

However, each of the ships is constrained in how far it can travel by a shared limited fuel source representative of a lifetime pool of funds. As such, deviation from the charted course of one of the ships influences how far the other ships can travel and thus, influences whether their locations can be reached.

After a first period of time as illustrated in FIG. 25, each of the ships A, B, and C has traveled toward its designated destination, consuming a portion of the limited fuel source. However, variables, such as a proverbial fiscal storm, have pushed each ship off course to different degrees from the previous course represented by a broken line. For example, such fiscal ships may have been pushed off course by unexpected expenses, under performance or over performance of an asset based on expected returns on investment, changes in tax law, among others, or any combination thereof. To continue toward their destinations, each ship may plot a new course to the destination or may plot a course to return to the previously plotted course. As illustrated in FIG. 25, each of the ships plots a new course to the designated destination (represented by a solid line between the ships and locations).

While not illustrated, new ships with new destinations, representative of changes in lifestyle and long-term goals, may also appear, placing further constraints on the limited fuel source. Further, some destinations that represent investment in income producing assets and non-performing income producing assets may lead to future re-supply of the limited shared fuel source, adding to the complexity of navigating to various destinations.

As the ships A, B, and C continue their travels, as illustrated in FIG. 26, constraints in the limited fuel source and further divergence from plotted courses may prevent some or all of the ships from reaching their destinations (i.e., each of the fiscal goals may not be possible given constraints on the availability of funds). As new destinations are explored, the selection of a new destination influences the ability of another ship to reach its destination by virtue of the shared limited fuel source. For example, a child may be accepted to a prestigious and expensive university, illustrated as a change in destination for ship C from the location 4, the Isle of College Tuition, to location 6, the Isle of Ivy League University. Such a new destination places constraints on the limited fuel source and thus, limits on the travels of other ships. For example, the destination of ship A may be altered to accommodate for the new constraints on the fuel supply. As illustrated, ship A may instead navigate to location 5, the Isle of Inexpensive Vacations, which is closer than the location 2, the Isle of Paradise Vacations.

As illustrated in FIGS. 24, 25, and 26, a limited shared fuel source places constraints on the travels of the proverbial ships. Analogously, a limited lifetime pool of funds results in an interconnection between fiscal goals, which are difficult to quantify without a personal financial model. In contrast with an accounting system that may project the balance of an account based on expected expenditures, a personal financial management system that incorporates a constrained personal financial model quantifies the effect of current and future decisions on personal goals. Such quantification of the effect provides a view into how current financial decisions lead to limitations or excesses in lifestyle later. Moreover, such quantification provides an indication as to which lifestyle goals are achievable and thus, provides the individual with a state of personal finance and possibly, a vision of financial well-being.

As such, a personal financial accounting and management system and method are described herein to assist individual persons in determining a state of personal finance. When the state of personal finance is in accord with individual purpose, a vision of financial well being exists. Further, a method is described for determining the effect of personal fiscal decisions and behaviors on an individual's financial state. The method may be implemented as software. Also, an apparatus is described for implementing the system and method on a stand alone computer or server connected to an interconnected network.

Personal financial management differs from business financial management in that personal financial management involves controlling and directing personal resources and the use of funds to realize present and future lifestyle expectations based on the assumptions of a finite earning life and a finite lifetime pool of funds. Generally, the present personal financial management system involves measures of personal finance performance and a desired asset mix. As such, the personal financial management system establishes a set of principles, rules, plans and constraints, among others, based on the finite time and total income associated with an individual and the general nature of the individual's goals and motivations. The principles, rules and constraints may be classified and linked based on the underlying assumptions. As such, a model can be formed assuming a closed system that incorporates a constrained lifetime of sources and uses of funds.

Moreover, the principles, rules, plans, and guidelines may lead to a personal finance code. A personal finance code is a financial plan to bring about a confluence of individual purpose and fiscal reality, i.e., a vision of financial well being. Individual purpose includes a set of lifestyle goals, both present and future, that have a fiscal component. To achieve a vision of financial well being, the personal finance code may incorporate planning for anticipated lifestyle and fiscal events (i.e., fiscal components of purpose) that may have an influence on a personal fiscal state to bring about a confluence of purpose and fiscal state, i.e., a vision of financial well-being. For example, the personal finance code may incorporate a present allocation of assents and a plan to bring about a future allocation of assets that leads to passive income and an associated lifestyle in retirement. In addition, the personal finance code may incorporate an allocation of sources and uses of funds, such as tuition payments, a vacation, a car purchase, or other lifestyle related purchases. Furthermore, the personal finance code may incorporate a combination of instances of any of such factors, among others. In general, the personal finance code is unique to the individual because each individual's source of funds, use of funds, goals, and concepts of financial well being are different.

For example, a particular individual's personal finance code may incorporate a present plan for the use of funds based on a fiscal plan for retirement and the anticipation of supporting a child through college. In another embodiment, the personal finance code may incorporate an asset allocation for a retiree in addition to a present plan encompassing receiving social security benefits and a use of funds allocations.

Figure 1:
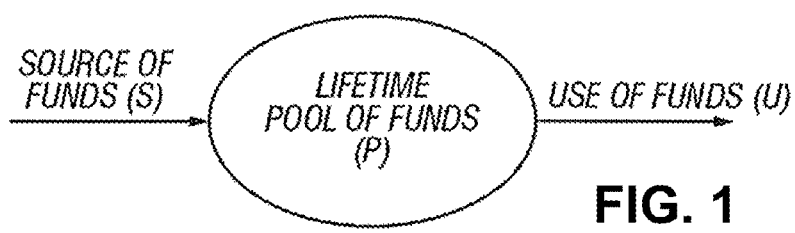
FIG. 1 includes a block flow diagram depicting the flow of funds of an individual.

In part, establishing a personal finance code is accomplished by establishing lifestyle goals and creating a plan for the source and use of funds from a lifetime limited pool to achieve the established goals. FIG. 1 is a block flow diagram depicting the flow of funds of an individual. In an example, the diagram may represent a person's lifetime. Within a lifetime, an individual acquires a finite amount of money (source of funds). The finite amount accumulates into the lifetime pool of funds (also a finite amount). The lifetime pool of funds is decreased by the individual's use of funds over his/her lifetime (also finite). For a person, the pool of funds is limited by lifetime and income potential.

The fact that the total funds that accrue to an individual over a lifetime is finite may be used to the develop a personal financial accounting and management system. Alternatively, the diagram of FIG. 1 may represent the source, use, and pool of funds over another finite period. Similarly, such a finite period provides finite limits to source, use, and the pool of funds, and may be used to develop the personal financial management system.

In an example, the source of funds (S) may be income, investment returns, trust fund benefits, gifts received, Social Security, gambling winnings, or inheritance, among other forms of monetary influx, or any combination thereof. The use of funds (U) may be lifestyle expenses, asset purchases, or other outward fluxes of funds, or any combination thereof.

Figure 2:
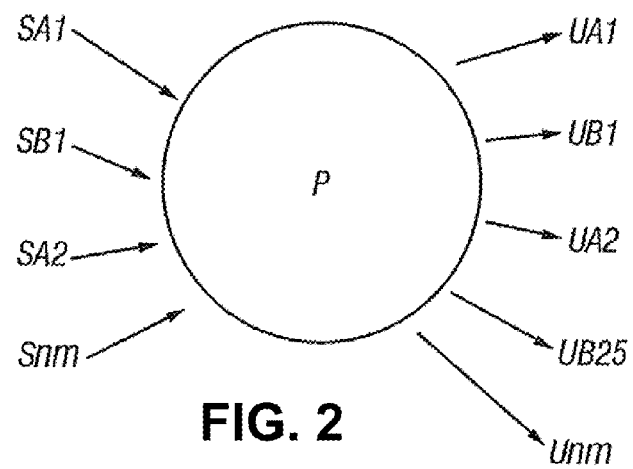
FIG. 2 includes a further block flow diagram depicting the flow of funds of an individual from multiple sources of income to multiple uses.

FIG. 2 is a further block flow diagram depicting the flow of funds of an individual from multiple sources of income to multiple uses. Similar to FIG. 1, FIG. 2 depicts multiple sources of funds flowing into a pool of funds (P) and multiple uses of funds flowing from the pool of funds (P). As in FIG. 1, each source, each use, and the pool are finite.

In FIG. 2, multiple sources are illustrated. Such sources may include more than one source of funds for a given period (SA1 and SB1), or such sources may include the same source across multiple periods (SA1 and SA2). Further, such sources may be any source for any period (SNM). The period may take many forms, including, for example, hourly, daily, weekly, monthly, annual, biannual, or other periods.

Similarly, the use of funds may be several uses for a given period (UA1, UB1), the same use over more than one period (UA1, UA2) or (UB1, UB25), or any use in any period.

As the pool of funds may be limited, each use and each source are linked. Excesses in one use may affect the available funds for another use. Further, a change in the source or amount of income may alter the funds available for each use.

For example, an increase in a source of income in a present period may enable use of those funds in any future period. A decrease in a present use may increase funds available for another use in the current period or for any use for any period in the future. Further, allocating use of funds for a future use may indicate the amount of income to be earned now to satisfy the future expenditure. In addition, a change in present source may alter a future source, such as retirement income and any other desired future source of funds.

In the short term, the use of funds can be easily matched with a source of funds. For example, going out to dinner this week may be paid for by the money coming from this week's paycheck. In a lifetime, the use of funds may be taken from a pool created from all sources of funds. Sources of funds, uses of funds, and time frame are all finite and measurable. As such, actions to the pool of funds today affect the amount of funds available in the future.

For example, spending $5,000 on a vacation this year may be measured by how it affects your retirement income 20 years from now. If the $5,000 is expected to grow at 8% compounded annual growth, it will turn into $20,000, 20 years from now. If retirement savings is expected to yield 10%, $20,000 will yield $2,000 in annual income. The decision to spend $5,000 on a vacation this year is a decision to have $2,000 less income per year at retirement.

Figure 3:
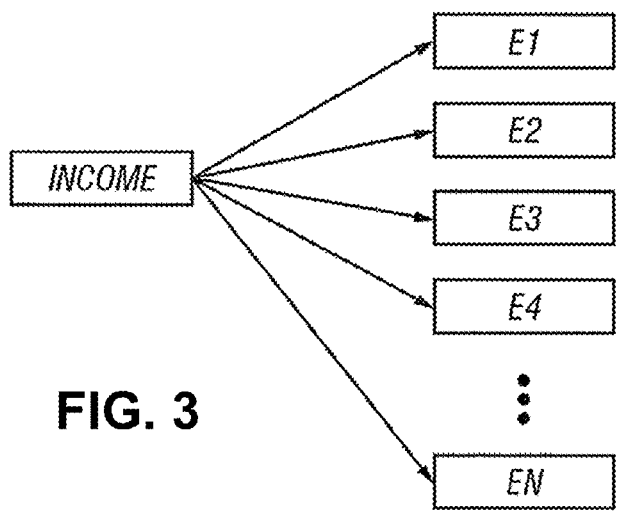
FIG. 3 includes another block flow diagram depicting the distribution of income.

FIG. 3 is another block flow diagram depicting the distribution of income. Income may be allocated to various uses. Such uses may include, for example, any combination of spending, debt reduction, gifting, or asset purchasing, or others.

The income allocation may be altered for future or subsequent periods. In addition, the income allocation may differ from an expected or budgeted income allocation. For example, a housing expense may exceed expectations. Further, an unexpected expense, such as a car repair or medical expense, may occur.

Figure 4:
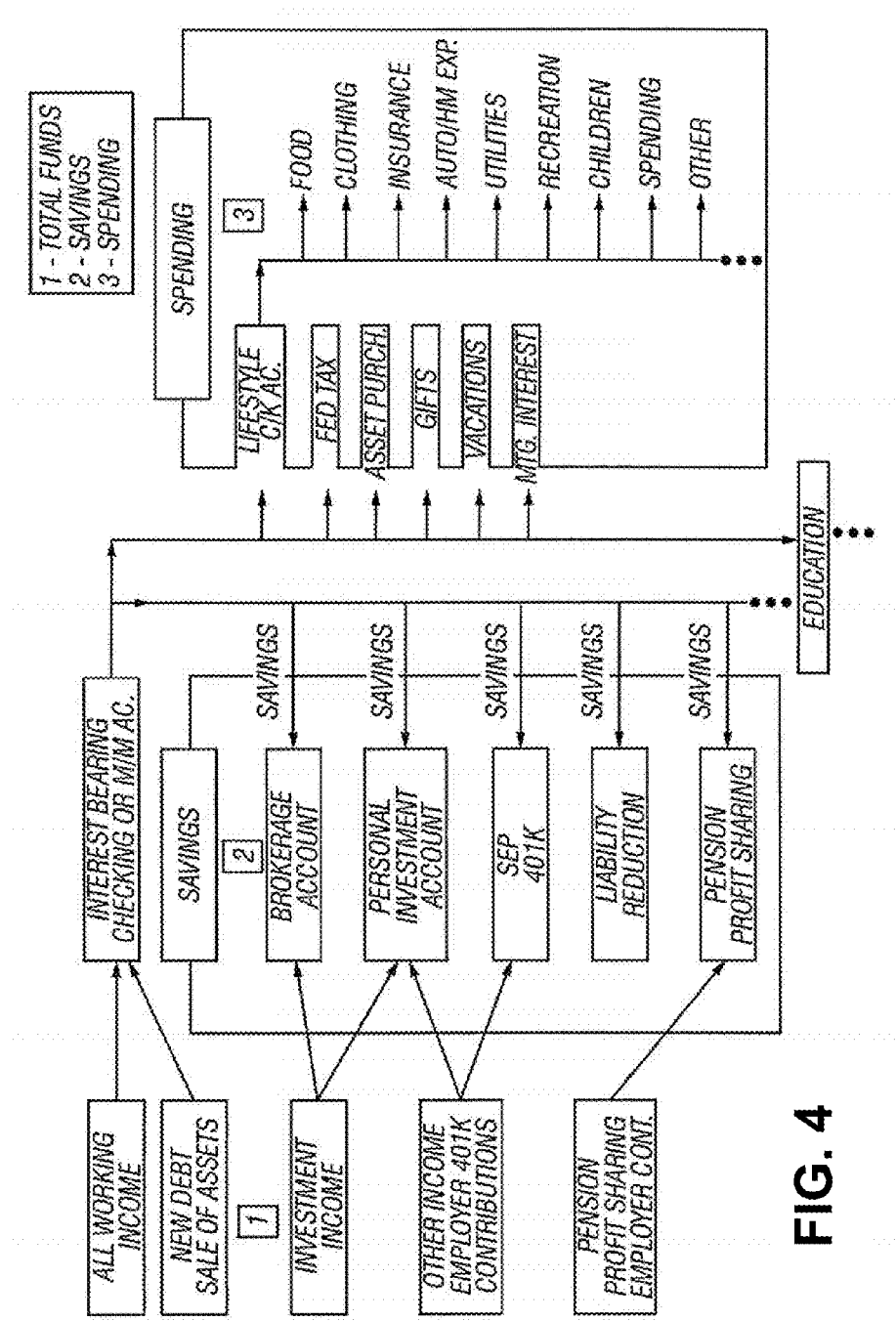
FIG. 4 includes a further block flow diagram depicting one exemplary embodiment of the flow of funds, according to FIG. 1.

FIG. 4 is a further block flow diagram depicting an exemplary embodiment of the flow of funds. In this exemplary embodiment, income is allocated to savings or spending, among others.

As illustrated in FIG. 4, income may take various forms. For example, Income 1 may include salary, commission, wage, or other earned income. Further, income may include investment income, employer contributions to retirement investments, gifts received, Social Security, profit sharing or other passive income.

Spending 3 may take various forms, including lifestyle expenses, federal, state and local taxes, asset purchasing (e.g., income consuming assets and neutral assets), gifting, vacations, mortgage and other debt interest, debt principle reduction, education, or other expenses. In particular, lifestyle expenses may include food, clothing, insurance, automobile, housing, utility, recreation, child-related, miscellaneous, or other expenses. Educational expenses may be considered different from other spending as it may feedback into non-passive income. Further, income producing asset purchases may feedback into investment income.

As used herein, Savings 2 is the purchase of assets or a reduction in liability. In addition, savings may take various forms, including buying assets in a brokerage account, personal investment account, or retirement account, among others. Such forms may also include pension shares, real estate, liability reduction, principle in home or other asset, or others.

Assets may be categorized into various categories. For example, assets may be categorized in to income producing assets (IPA) and income consuming assets (ICA). Optionally, the categories may include non-producing income producing assets (NPIPA). In addition, the categories may optionally include neutral assets (NA). In particular, such categories may include income producing assets (IPA), income consuming assets and liabilities (ICA), non-performing income producing assets (NPIPA), and neutral assets (NA), among others.

Income producing assets (IPA) are any assets that produce income. An IPA may take the form of savings accounts, equities, bonds, or real estate investments, among others. Further, IPAs may be assets that produce income and are liquid or have a market value.

Income consuming assets (ICA) are assets that use continuous funding to support their existence. For example, an ICA may be a house with a mortgage. Other forms include cars, boats, airplanes, or vacation homes, among others, that have associated debt payment or maintenance.

Neutral assets (NA) are assets that do not produce or consume income. Such NAs may include artwork or furniture, among others.

Non-performing income producing assets (NPIPA) are assets that require an event to produce income. For example, a residence may be a house with a mortgage. The value of the house may, for example, be $250,000. Of the $250,000, for example, $200,000, may be owed in a mortgage. The $200,000 is an ICA. The remaining $50,000 may be an NPIPA. The house may be sold to realize the income. In another example, the NPIPA may be raw land. Further, NPIPA may not produce income, be liquid, or have a market value.

IPAs and, within some future period, NPIPAs may feedback and add to income. ICAs generally add to expenses. Typically, NAs have little effect on money flow, except perhaps as an expense in one period.

The purchase of assets and allocation of income to expenses and savings represents the activities associated with a fiscal state. However, the fiscal state may be measured against some standard. People vary considerably in income, desired lifestyle, fiscal habits and behaviors, and fiscal needs. To establish a standard relative to which an individual may measure a personal fiscal state or performance, an individual's purpose may be established.

The individual's purpose may be derived from future lifestyle events anticipated by the individual or from a desired asset allocation. For example, an individual may have children who may have college expenses 10 to 15 years in the future. An individual may estimate the monetary and asset requirement to pay for the anticipated expense of college. In another example, an individual may anticipate retiring early or to a desired lifestyle. The individual may anticipate a quantified monetary amount to maintain the desired lifestyle after retirement. Further, an individual anticipating retirement or a retired person may desire a specific asset allocation.

For example, a retired person may desire an asset allocation that includes a heavy weighting in income producing assets to provide passive income, enabling the desired lifestyle. Alternatively, a person anticipating retirement many years away may prefer to incorporate NPIPAs into a set of assets.

As such, anticipated expenses, quantified lifestyle costs, and asset allocation preferences represent an individual's purpose. While the individual's purpose represents elements of lifestyle in both the present and future, it is quantified in fiscal terms as part of a personal financial management system. Through the personal financial management system a personal financial code is established which incorporates a current allocation of assets and a fiscal plan to bring about the confluence of individual purpose and fiscal state to provide a vision of financial well being. Accordingly, the personal finance code may incorporate budgetary guidelines for elements of lifestyle, as each of the elements of a desired lifestyle is interconnected. Specifically, some overspending on one element of lifestyle may conflict with an element of an individual's purpose, such as anticipated future expenses or asset allocation preferences. For example, a new luxury car may conflict with saving for a child's education and avoidance of ICAs, bringing about disaccord between purpose and fiscal state, preventing a vision of financial well-being.

Figure 5:
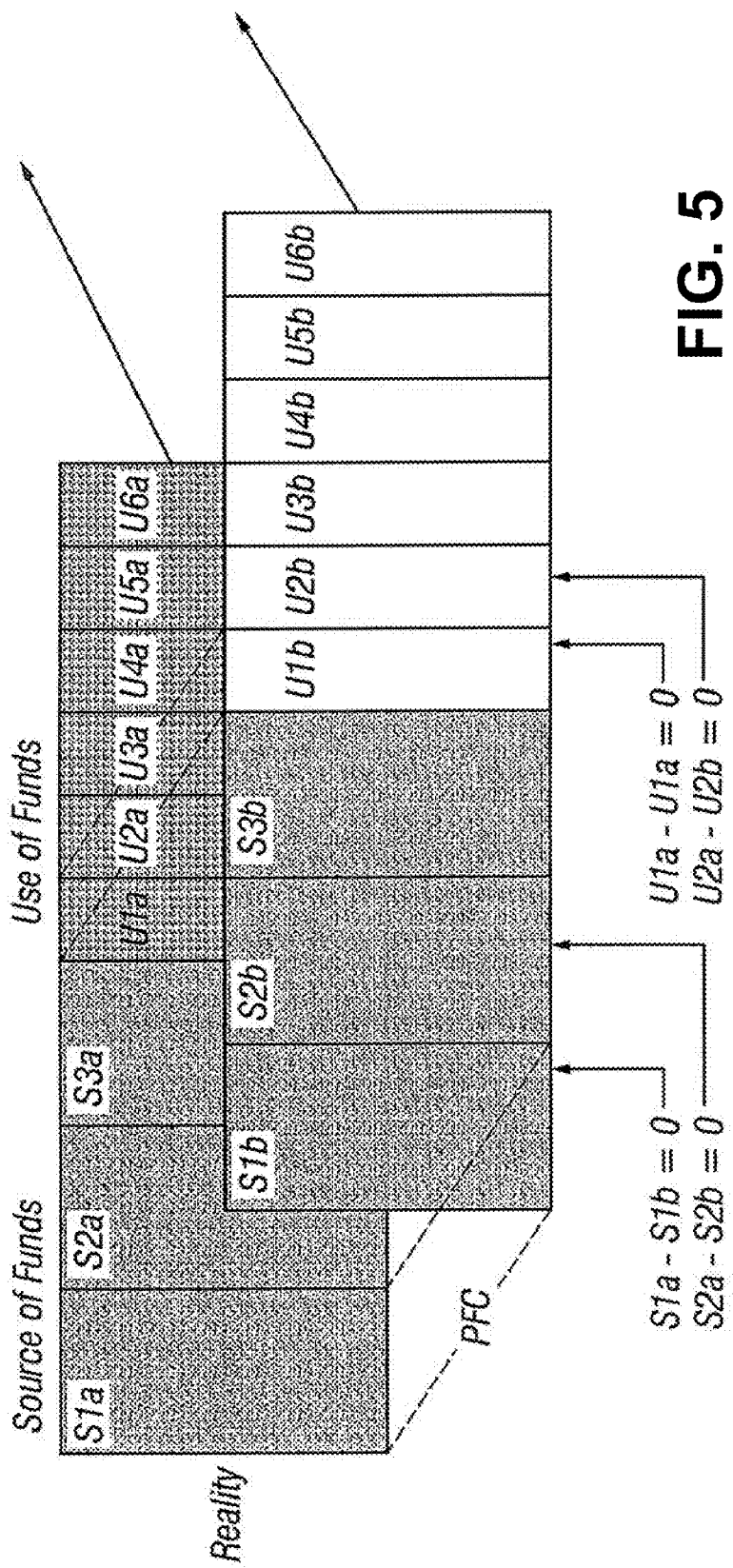
FIG. 5 includes a block schematic diagram depicting an exemplary embodiment of a comparison of budgetary guidelines to actual fiscal behavior.

In a further example, FIG. 5 is a block schematic diagram depicting an exemplary embodiment of a comparison of budgetary guidelines to actual fiscal behavior. As illustrated, an actual fiscal performance for a period is compared with the budgetary guidelines of the personal finance code. For example, the actual amount of a source (e.g., S1a) is compared with the budgeted amount for that source (e.g., S1b). In an example, a difference is found between the two amounts (S1a and S1b). Similarly, other sources (S2, and S3) and uses (U1, U2, U3, U4, and U5) can be compared.

As illustrated, each of the actual sources of income and expenses matches the budgeted quantities and constraints. As such, actual fiscal behavior matches those derived from the personal finance code. Accordingly, the state of personal finance may be considered good.

Figure 6:
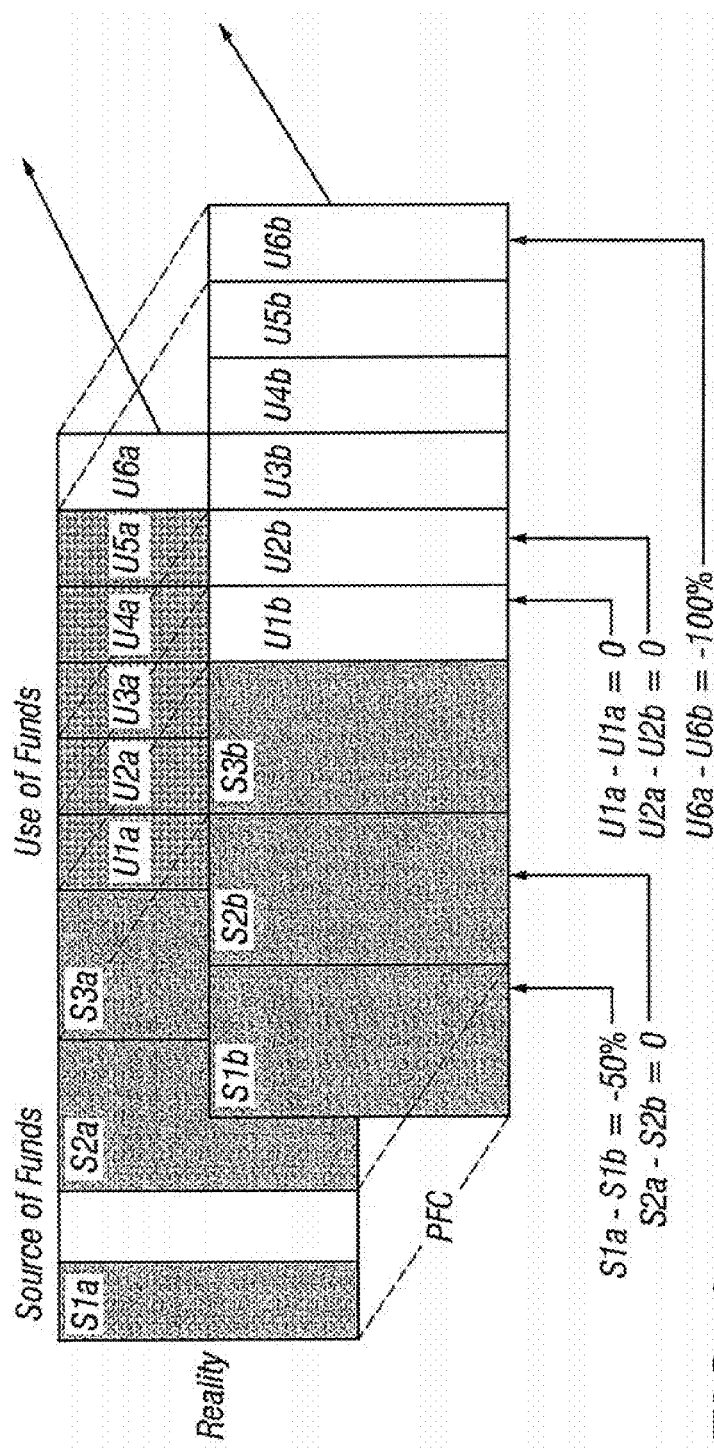
FIG. 6 includes another block schematic diagram depicting a further exemplary embodiment of a comparison of budgetary guidelines to actual fiscal behavior.

Alternatively, the actual fiscal behavior may not match with the budgetary guidelines. FIG. 6 is another block schematic diagram depicting a further exemplary embodiment of a comparison of budgetary guidelines to actual fiscal behavior. As illustrated in FIG. 6, an income source (S1a) does not match the budgetary guideline (S1b). The reduction in income may have been an under performing stock dividend, loss of work or wages, or another reduction in income. In another example, an unanticipated expense may have occurred (U6a). For example, a car may have been repaired, an unexpected medical expense may have occurred, or the person may have bought something that does not exist in the budget.

As illustrated, income may exceed, meet, or miss expectations represented by the budgetary plan. Similarly, expenses and uses may exceed, meet, or miss expectations. Each of these disparities between the budgetary guidelines and the fiscal behavior may have projected consequences. For example, lost income without a similar reduction in expenses may lead to a reduction in assets and an inability to meet a future fiscal event. Moreover, such disparities may lead to a poor state of finance as quantified by projected disparities between the actual financial behavior of the individual and that quantified in the personal finance code.

In an example, periodic evaluation of the individual's financial state may aid in determining corrective action. Conceptually, determining corrective action is analogous to plotting a new course for the ships illustrated in FIGS. 24, 25, and 26.

Figure 7:
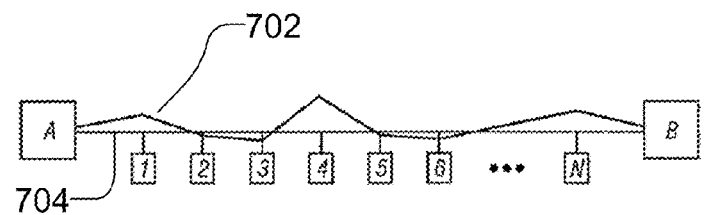
FIG. 7 includes a timeline representation depicting an exemplary embodiment of periodic assessment and redirection of fiscal behavior.

To further illustrate periodic evaluation of a financial state, FIG. 7 includes a timeline representation depicting an exemplary embodiment of periodic assessment and redirection of fiscal behavior. As illustrated, in each period (1, 2, 3 . . . N), a comparison is made during the period between the fiscal plan and the actual behavior to determine the state of personal finance. The horizontal line 704 represents the budgetary guidelines or plan. The line 702 shows actual performance during the then current period. The distance between the lines 702 and 704 indicates a state of personal finance. When 702 and 704 are in contact, the state of personal finance is in accord. However, when a large distance exists between 702 and 704, the state of personal finance is poor.

With periodic evaluation, the individual may take corrective action or observe the effect of financial behavior relative to the personal finance code. With periodic reallocations of assets or changes in fiscal habits and behaviors, the individual may, for example, meet a future fiscal event (e.g., event B). As the individual moves through time toward a goal, periodic corrections may enable the goal to be realized. As illustrated, corrections are made to return to an established path to meet the future fiscal events. Alternatively, a new path may be established from the then current state.

In part, fiscal behavior is reflected in the ratio of asset classes. For example, FIG. 8 is a tabular graphic depicting an exemplary embodiment of a periodic assessment and reallocation of assets, according to FIG. 7. FIG. 8 includes an exemplary report illustrating the projected ratio of asset allocations, as described in more detail below. As illustrated, periodic evaluation and reallocation may adjust the actual fiscal behavior to meet a personal finance code reflected in ratios of asset classes. In an exemplary embodiment, the personal finance code may be characterized by a desired asset allocation. In such a case, the desired asset allocation may be, for example, 80% IPA.

Further, periodic evaluation and reallocation may compensate for unanticipated events and changes in fiscal behavior. For example, the individual represented in the figure may purchase a house after the first period. The mortgage on the house may make that house an ICA. As such, the asset allocation shifts from 83.3% IPA to 65.44% IPA. Such a shift conflicts with elements of the personal finance code that encourage 80% IPA. Subsequent reevaluations and reallocations increase the IPA. However, full corrective action may not occur until the house is sold, as illustrated by the change from 68.81% IPA to 97.4% IPA between Dec. 31, 1997 and Dec. 31, 1998. The resulting IPA is then excessive and the ICA is low. For example, an ICA may also represent an item associated with lifestyle (e.g., a car, a boat, or a vacation home). An excessively high IPA may indicate under spending on present lifestyle and thus, missed opportunity to derived pleasure from the assets. Again, corrective action may be taken.

In this manner, the periodic reevaluation allows reallocation to meet the personal finance code or to prepare a new personal finance code based on a revised purpose in view of fiscal state. Further, projection of the consequences of an action may be used to make better decisions. For example, if the individual projected the consequences of buying the house on the valuation of IPAs, the person may not have made the purchase or may have selected a different house. Moreover, the individual may be able to see how each financial decision affects his/her overall state of financial well-being before the decision is made.

In general, the state of personal finance is a reflection of the disparity between the personal finance code and the actual fiscal behavior. The projected effect of the disparity over subsequent periods provides an indication of the state of personal finance.

One method used for planning is to project future performance based on past performance. In this manner, the present state and anticipations about the future are derived from the past. An alternative method may include setting the future fiscal goals and determine the present state based on present fiscal behavior relative to a path toward the stated future fiscal goals. Both methods are illustrated in FIG. 9, which includes a graphic diagram illustrating exemplary methods for budgeting.

Figure 9:
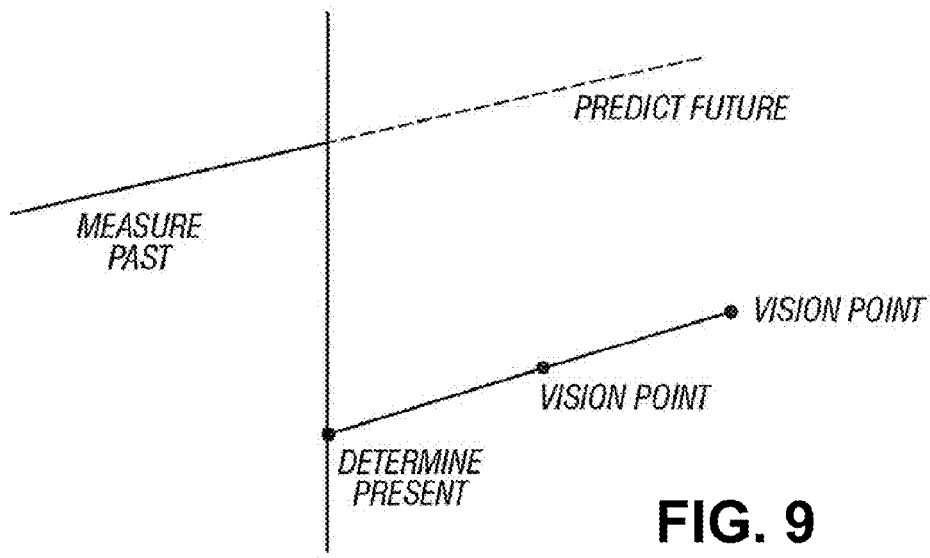
FIG. 9 includes a graphic depicting exemplary methods for fiscal planning.

In FIG. 9, the first method is illustrated in which the measured path is projected as a broken line to the future. However, the personal finance code method is illustrated as a set of future fiscal events, vision points, or asset allocations. Such events, vision points and allocations may be used to determine the fiscal state at present. For example, a desired quantity for a child's college education may be represented as a future event or vision point. To reach the education goal, establishing a present financial behavior may be useful. The established behavior may, for example, be represented as a value of a brokerage account or a monthly deposit and purchase of assets to be allocated for the college education or in other words, establishing a personal finance code. The personal state of finance may then be measured. For example, the differences in actual fiscal behavior from the established fiscal behavior in a subsequent period may prevent the achievement of the goal.

Establishing the personal finance code results in budgetary guidelines, which allow the individual to meet future goals. Further, future deviations from the budgetary guidelines or additional restrictions may project negatively against the personal finance code and lead to a poor fiscal state. In addition, budgetary guidelines imposed by one aspect of a personal finance code may affect the budget allocation to other uses or may affect the desire for other sources of income.

As such, many equations may be used to express the relationship of multiple uses, sources, allocations, future events, budgetary guidelines and other aspects resulting from the personal finance code and fiscal behavior. The method may be implemented in software or through computational circuitry as described in more detail below.

Figure 16:
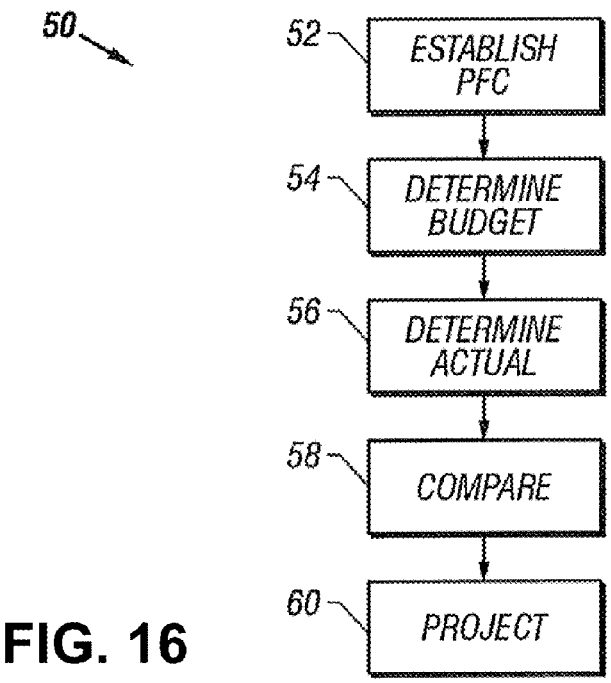
FIG. 16 includes a block flow diagram of an exemplary embodiment of a method for determining a state of personal finance.

For example, FIG. 16 includes a block flow diagram of an exemplary embodiment of a method 50 to determine a state of finance for an individual, person, or family relative to an individual's purpose. The exemplary method may be implemented in software for use in a system, such as the exemplary systems of FIG. 10 and FIG. 11, described below. In a block 52, a personal finance code is established. The establishment of a personal finance code may include setting an asset allocation and a fiscal plan, anticipating a future event for which money may be used, or determining a present lifestyle feature for which money may be used. In an example, assets are allocated into categories including IPA, IC, NPIPA, and NA.

From the personal finance code, budgetary guidelines may be determined, as illustrated in a block 54. Such budgetary guidelines may, for example, be monetary limits on various categories of expenditures. In one exemplary embodiment, the personal finance code may have an annual allocation of expenditures. Such annual allocations may be converted into monthly spending limits or a budgetary plan. Steps performed in establishing the personal finance code may or may not overlap with those steps of determining budgetary guidelines.

In a block 56, the actual fiscal behavior of the individual or person is determined. The fiscal behavior, for example, may be determined from bank transaction statements, checkbook entries, asset performance, actual savings behavior, or debt payment, among others. Further, the information may be acquired electronically through an interconnected network. Forms of data mining may be used to convert information, such as transaction information, into the fiscal behavior. For example, expenses found on a bank statement may be automatically categorized into spending categories. In another example, assets found on a brokerage balance statement may be categorized automatically.

Such actual behavior may be compared to the budgetary guidelines, as illustrated at 58. In an exemplary embodiment, a categorized fiscal behavior may be subtracted from a budgetary guideline. Alternatively, other methods may be used.

From this information a projection may be made as to the effect of fiscal behavior relative to the individual's purpose, as illustrated at 60. For example, straight-line projection may be used. The difference in the above comparison may be projected over time to indicate the effect of the actions relative to the personal finance code. The projection, for example, may indicate the value of assets at retirement or the amount in an educational savings account at some future date when a child may use money for college. As such, the projection may be used to understand the effect of today's actions on future expectations. For example, $10,000 a year allocated to retirement for 25 years at 8% return will yield $731,000 at retirement. If the individual expects to retire with $2,500,000, then the annual contribution is not in keeping with a personal finance code that will lead to the confluence of purpose and fiscal state, i.e., a vision of financial well being. To resolve the conflict, the individual may contribute more money every year, increase the rate of return that he/she is expecting, increase the number of years until retirement, or decrease the amount of money he/she expects to receive at retirement.

In another embodiment, the projection may be determined by comparing cumulative balances of the differences between budget and projected actual behavior for future periods. For example, if the differences between the prior fiscal behavior and budgetary guidelines remain, the future consequence may be an excess in one category and a negative balance in another category. For example, excess spending on gifts may cause a deficit in a funds pool that leads to a reduction in spending in other categories. As such, the reduction in spending may represent a deviation from the desired lifestyle.

The actual behavior may be determined at any point before the comparison. Further, determining the actual fiscal behavior and determining the budgetary guidelines may be performed in any order or simultaneously. Alternatively, determining the personal finance code and projecting may be performed with the assumption that the fiscal behavior and the budgetary guidelines match when determining a current fiscal state and vision of financial well being.

In an exemplary embodiment, the method may be implemented in software instructions operable by computer. In an example, the computer may provide a set of input interfaces and reports to implement the method. An exemplary subset of the interfaces is illustrated in FIG. 29 to FIG. 32.

For example, the input interfaces can include a source and use interface and an asset interface. FIG. 29 includes an illustration of an exemplary source and use input interface. Individuals, such as couple John and Joan, can have employee income and can contribute to retirement accounts. As illustrated in the source of funds entry table of the exemplary interface illustrated in FIG. 29, the salary and retirement contributions for each of John and Joan may be entered. The interface may include additional entries, such as S-1 through S-4, for entering income from other sources. Further, entries may be provided for the sale of assets, including the sale of IPAs, ICAs, NPIPAs, NAs, and educational investments (EDA). Educational investments (EDAs) are income producing assets set aside for educational purposes. In addition, entries are included for the appreciation of investments. As illustrated, the total of the sources is $233,400.

Further, an entry table may be provided for use of funds. As illustrated, John and Joan have categorized use of funds as lifestyle, with the total being $128,500. Alternatively, the entries, such as entries U-2 through U-14, may be provided for separating and further subdividing lifestyle expenses into the uses described above, such as clothing, utilities, entertaining, charities, or food, among others. In addition, the use table provides entries for taxes, the purchase of IPAs through a retirement account, the purchase of IPAs outside of a retirement account, mortgage interest, debt repayment, or the purchase of other assets, among other categories. Further, the table may include entries for reinvesting income within a retirement account. As illustrated, the total use of funds is $233,051.

Within the present system, the difference between the use of funds and the source of funds is approximately zero. To make the difference approximately zero, adjustments are made to uses and sources.

Figure 30:
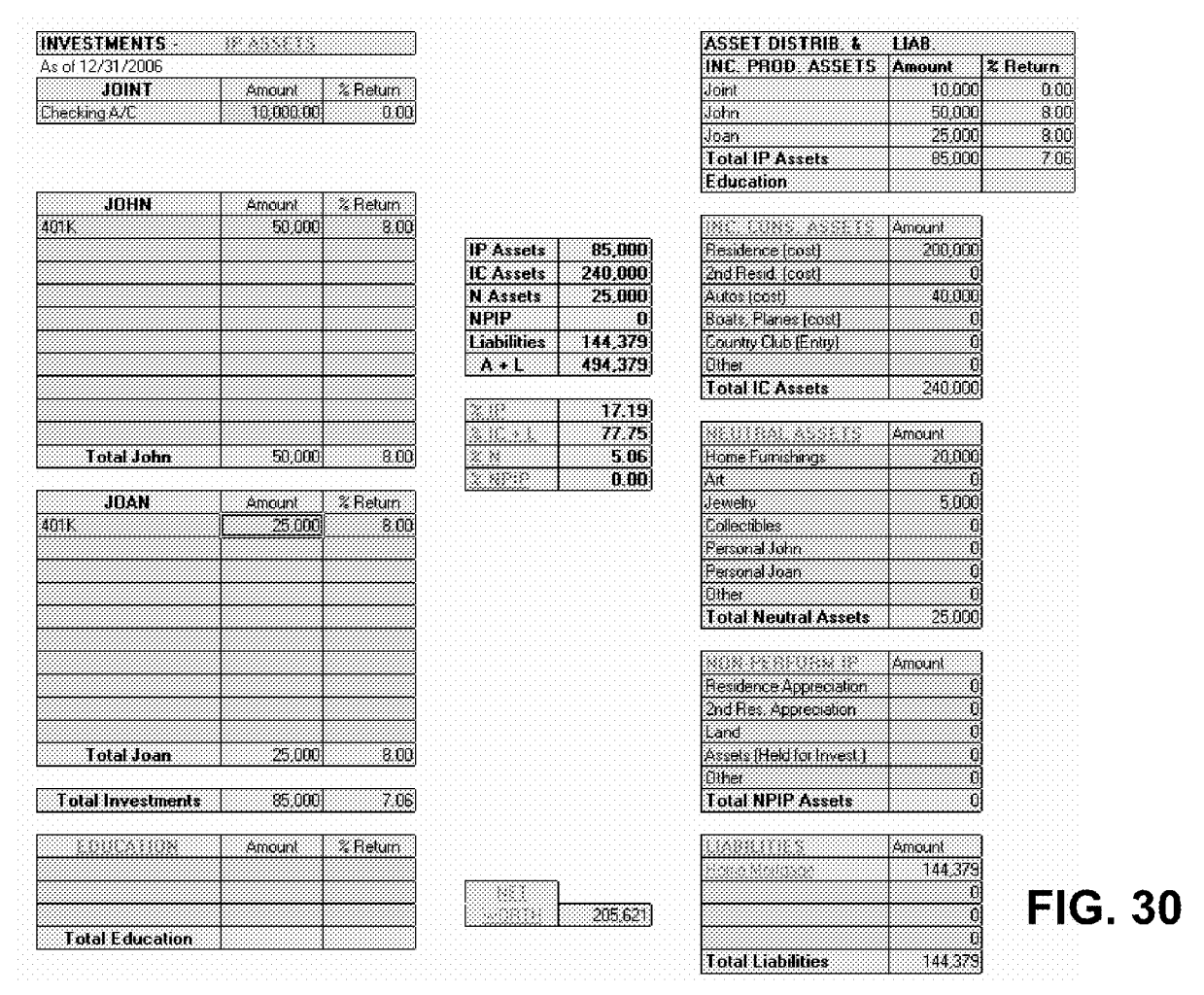

As illustrated in FIG. 30, an interface may also be provided for entry of assets. For example, an entry may be provided for each of John and Joan for each of the asset categories: IPA, ICA, NA, and NPIPA. The IPA category may be further divided to separately identify IPAs designated for future educational expenses. In addition, liabilities, such as mortgages and other loans may be entered through the interface illustrated in FIG. 30.

Various reports can be derived from the entered data. For example, as illustrated in FIG. 29, the source and use categories can be used to derive monthly amounts. Additional interfaces may be provided for entering actual amounts derived from or spent on the category and a report may be generated to show the monthly difference and project the cumulative effect on the state of personal finance. In another example, a report can be generated to project the amount of assets and compare the projected amount with actual amounts. As illustrated in FIG. 31, the projected amount of assets and liabilities within each asset category for each individual is provided. In the illustrated example, the actual amounts are assumed to be equal to the projected amounts. However, as time progresses, the individuals may enter the actual amounts and a difference is calculated. As further illustrated in FIG. 32, the amount of assets and liabilities can be projected to the point of retirement, for example, 25 years. In a further example illustrated in FIG. 33, the ratio of assets within various categories can be projected and an estimated retirement income projected. For example, John and Joan can have a projected percent of income producing assets of 90.42 and a projected retirement income of $200,053.

As illustrated through the example, John and Joan may establish a personal financial code. For example, John and Joan may want to live in their current house for a number of years with their current lifestyle, retire in 25 years, and have a lifestyle at retirement similar to their current lifestyle, while spending time working with charities or with grandchildren. Such desires represent John and Joan's purpose. In an example, John and Joan can identify features of their individual purpose that have fiscal components, such as an annual retirement income, an asset allocation at retirement, and a level of lifestyle to live at present (i.e., designating sources and uses of funds). In addition, John and Joan have a current allocation of assets. Using the current allocation of assets and aspects of individual purpose that have a fiscal component, such as the designated sources and uses of funds, a personal finance code is established and the system may derive monthly amounts for the various categories. The current source and use of funds and allocation of assets can be projected to determine whether their purpose is in accord with their fiscal state. If not, aspects of their purpose can be adjusted. For example, expectations of current lifestyle can be reduced to bring about an increase in retirement income. A revised personal finance code can be generated and projected. In addition, as time progresses, the personal finance code can be compared to actual fiscal behaviors and the effect projected. If John and Joan's fiscal state, including present and future source and use of funds, is in accord with their identified individual purpose, John and Joan have a vision of financial well being. However, if the fiscal state and individual purpose are not in accord, John and Joan should make changes to bring about a confluence of the fiscal state and individual purpose to achieve a vision of financial well being.

In another example, a retired coupled Jack and Jill may use the system to determine their fiscal state. Jack and Jill may, for example, want to maintain their current lifestyle, travel extensively, and give money to grandchildren. In addition, Jack and Jill may be concerned about medical expenses. As illustrated in FIG. 34, Jack and Jill derive income from sources, such as Social Security and the sale of income producing assets. In addition, Jack and Jill have lifestyle expenses, vacation expenses, gifts to children and grandchildren and medical expenses, as well as taxes and a mortgage. They also invest in education for their grandchildren. FIG. 35 includes an exemplary asset allocation for Jack and Jill. Using the fiscal data, a personal finance code is generated and projections are made, including a projection of the ratio of asset categories and retirement income. As illustrated in FIG. 36, the percentage of IPAs is greater than about 75% and gradually increases to greater than 80% over time. In addition, this asset allocation results in a gradually increasing retirement income that compensates for inflation, which provides the ability to maintain their current lifestyle despite inflation. As such, Jack and Jill's fiscal state is in accord with their individual purpose, bringing about a vision of financial well being.

The present system may also be used to assist with making decisions that have a fiscal component. In an example, the present system may be used to assist with decisions regarding house purchases, car purchases, vacation planning, or investment choices, among other fiscal decisions. For example, a couple may be planning to retire and may be planning to sell their current home and move to a beach community. Initially, the couple would like to buy a house on the golf course, join the golf club, maintain their lifestyle in light of inflation, take one big vacation per year, and have money for medical expenses that will likely grow over time. The house on the golf course costs $550,000 and after the sale of their existing home, the couple would have a $200,000 mortgage on the new home. The couple has approximately $1.35 Million in income producing assets and FIG. 37 illustrates the couple's expected expenses.

Based on the information provided, a personal finance code is established and a projection is made as part of a determination of the couple's fiscal state. As illustrated in FIG. 38, the percent of income producing assets is below 70%, which leads to almost no growth in projected retirement income. Such a fiscal state is in disaccord with the couples concern about medical expenses and desire to have income grow with inflation. As such, a vision of financial well being is absent.

Figure 39:
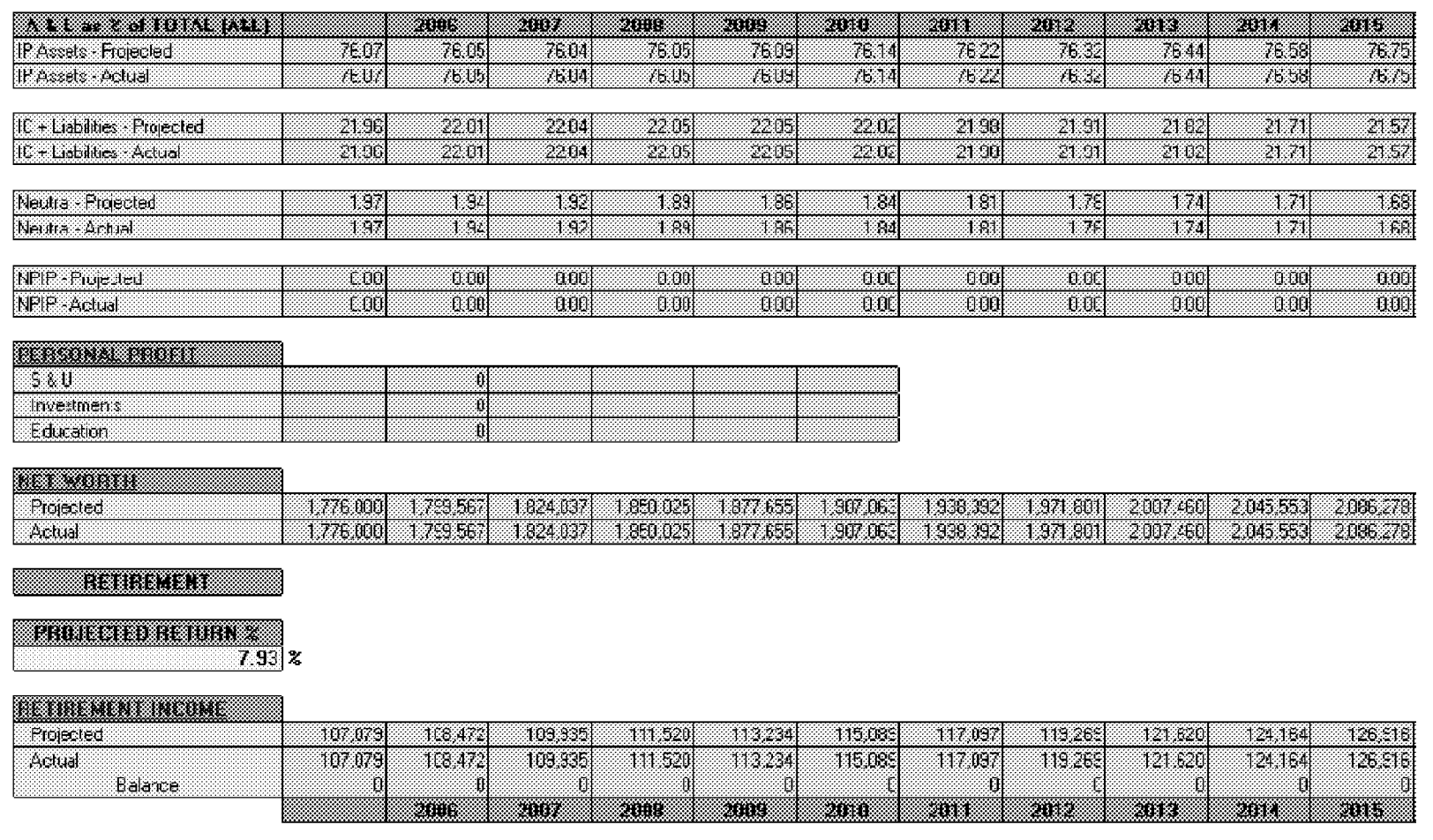

The couple reconsiders. Instead, they consider purchasing a $350,000 townhouse close to the golf course. This change reduces or eliminates the mortgage and changes the overall allocation of assets. As illustrated in FIG. 39, the projected retirement income rises at a rate faster than typical inflation. The couple is able to maintain their lifestyle and vacation plans, and have enough income to compensate for medical expenses. In this manner, the couple is able to adjust their individual purpose to match fiscal reality and achieve a vision of financial well being.

Figure 17:
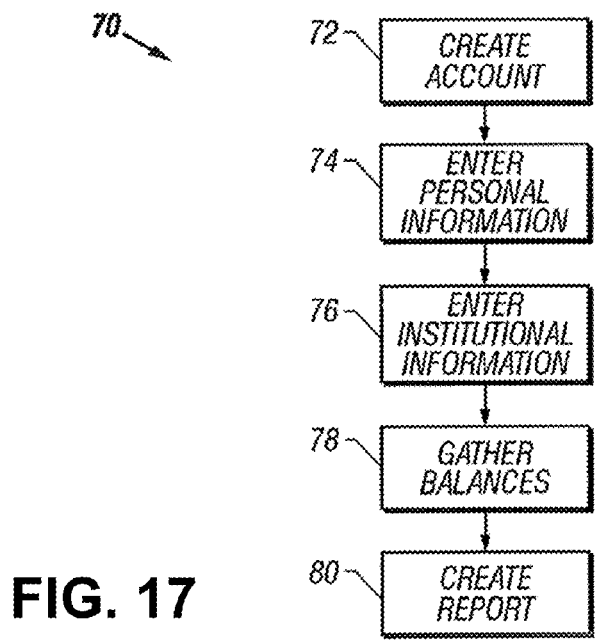
FIG. 17 includes a block flow diagram of an exemplary embodiment of a method for use in systems, such as the systems illustrated in FIGS. 10 and 11.

In a further example, the system may be used in conjunction with data associated with accounts from various financial entities. The system may assist Jack and Jill in monitoring their fiscal state based on future fiscal behaviors by accessing data from the financial entities. For example, FIG. 17 is a block flow diagram of an exemplary embodiment of a method 70 for use in systems, such as the systems illustrated below in FIGS. 10 and 11. Software may be used to establish and perform the method 70.

As illustrated in a block 72, the user may create an account, and the user may enter personal information or information associated with various financial entities, as illustrated at 74. Such personal information may include information relating to the personal finance code, identification, assets, or fiscal relationships, among others. The information associated with various financial relationships may include, for example, identities of banks, account numbers, account values, or access information, among others.

As illustrated in a block 76, the system may gather information about the financial entities (e.g., account information) and, as illustrated at 78, gathering data from the financial entities. For example, the system may gather data from banks, brokerage houses, or other financial institutions. Such data may be used to ascertain current fiscal behavior and compare the current fiscal behavior to the personal finance code. Finally, the system may create a report, as illustrated at 80. Such a report may take various forms, including a cumulative balances report, an asset allocation report, or a goal attainment assessment report, among others.

Figure 18:
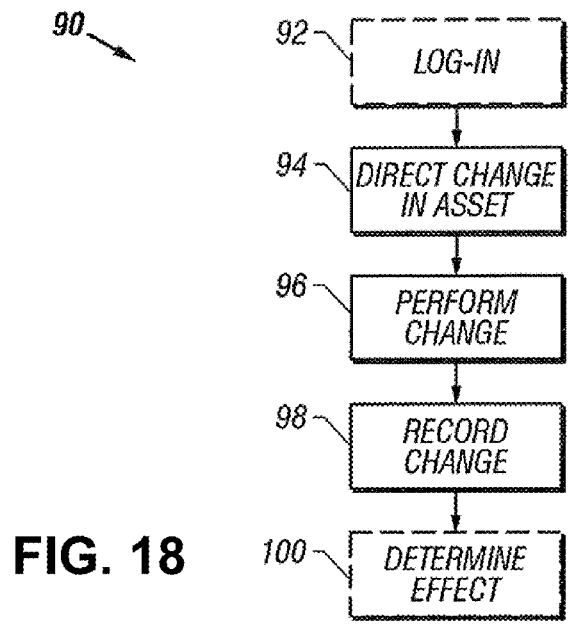
FIG. 18 includes a block flow diagram of an exemplary embodiment of a method for use in systems, such as the systems illustrated in FIGS. 10 and 11.

FIG. 18 includes a block flow diagram of an exemplary embodiment of a method for assessing the effect of a change in behavior on the state of personal finance. In another exemplary method, the user may be purchasing or reallocating assets or effect some change that may alter the state of personal finance. For example, the user may log-in to a broker and direct the purchase of stock.

In the exemplary method 90, the user may log-in to a financial institution's server or software on the computational circuitry, as illustrated in a block 92. For example, the user may access a financial institution through a web browser. However, the user may also be identified by a cookie.

The user may direct a purchase, sell, or change in the asset, as illustrated in a block 94. The change may be performed, as illustrated at 96, and the information regarding the change recorded by the personal financial management system, as illustrated 98. Further, the personal financial management system may project the effect of the change relative to the personal finance code, as illustrated at 100, for example to determine a state of finances that can be compared to an individual's purpose.

For example, a user may access a brokerage website and purchase shares in a mutual fund. The purchase of the asset may be manually entered into the personal financial management system or the personal financial management system may communicate with systems associated with the brokerage website to automatically record the acquisition of the mutual fund shares as income producing assets. With the record of the income producing assets, the personal financial management system may project the influence of the purchase relative to personal finance code, providing the user with an indication of their state of personal finance, which can be compared to the individual's purpose.

Figure 19:
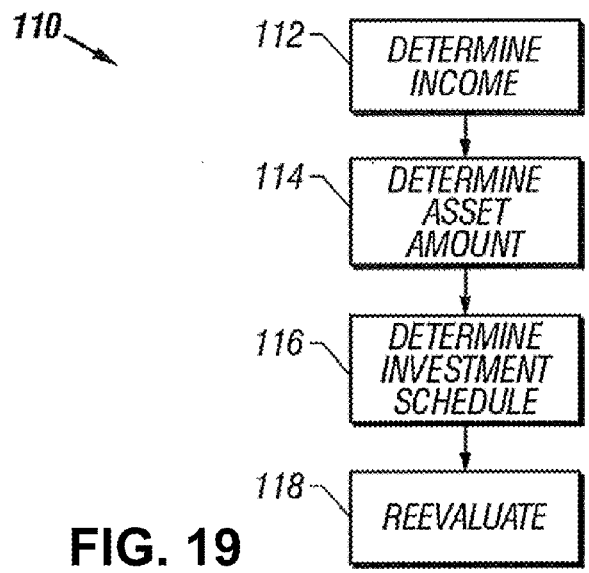
FIG. 19 includes a block flow diagram of an exemplary embodiment of a method for investing for retirement.

In particular, the system and method may be configured to assist in answering personal finance questions. An exemplary personal finance question is "how much income will be required at retirement?" FIG. 19 is a block flow diagram of an exemplary method 110 for saving in a manner that compensates for inflation, reducing the difficulty of answering the question.

At a first time, an individual determines how he/she would like to live relative to his/her present lifestyle, as illustrated at 112. For example, a person making $50,000 may desire the same lifestyle. Alternatively, the individual may desire a lifestyle costing 150% of the present lifestyle.

As illustrated at 114, the amount of assets that produce that same present valued income is determined. In the example above, the individual may determine the quantity of assets to produce $50,000 per year at a given estimated rate of return. For example, the individual may desire $500,000 assuming a rate of return of 10%. Alternatively, the individual may desire $1,000,000 assuming a 5% rate of return. Such a numerical value can be used to determine at least a part of the personal finance code.

In a further step, budgetary guidelines and investment schedules are determined from the above amount, as illustrated at 116. For example, to save $500,000 in 25 years, IPAs may be purchased annually. The individual may use an annual investment schedule with fixed interest. The $500,000 in the example above results in an annual investment of approximately $5084. However, other methods may be used to determine an annual investment schedule. Further, various schedules may be applied. For example, monthly schedules may be applied and ramping investment schedules may be used.

As illustrated at 118, the method may be repeated at a subsequent time. For example, in a next year, the individual may reevaluate their investment goals. The individual may, for example, receive a raise to $55,000 and prefer to save to live at that lifestyle level. As such, the desired amount of retirement assets may be adjusted to $550,000 and the method repeated. The annual investment amount, however, is augmented by the assets already designated for retirement from the previous period. Further, the length of the investment schedule is shorter. Using the calculation methods above, the individual may desire to save approximately $5592 to achieve the income equivalent to the income after the raise.

One consequence of such a method of adjusting the investment amount to meet a changing personal finance code is the ability to compensate for inflation. The individual makes an annual adjustment to the end goal based on a desired level of lifestyle based on present valuations. The periodic adjustment compensates for inflation by repeatedly adjusting the end goal to a new lifestyle valuation. Each new adjustment takes inflation into account from the previous period. Adjusting over time automatically takes inflation into account because each new personal finance code uses the real inflation rate, not an estimated inflation rate. Another consequence may be, in some instances, the percentage of income allocated to retirement savings may actually diminish over time despite increasing contributions. Alternatively, other schedules and investment return, calculation methods may be used.

Further this method may be abstracted to other individual purpose goals. For example, the individual may, each year, complete a new source and use allocation. Each year, completing a new source and use statement changes the personal finance code. As such, the budgetary guidelines are adjusted. In terms of the ship analogy, each year a user may re-chart a path to the desired financial destinations.

To further illustrate, an exemplary individual's plan for retirement is provided below in TABLE 1. For example, an individual may plan to retire at their then current lifestyle. As such, contributions are adjusted in each period so that the projected retirement income matches the then current salary. In this manner, adjustments for inflation and increases in lifestyle expenditures are automatically included without guessing the value of inflation.

In the example of TABLE 1, an exemplary individual has an initial total income of $80,500 and income producing assets of $75,000. Based on a simple projection, a determination is made as to what amount of annual contributions will lead to a projected retirement income that is equal to the current income. Periodically, adjustments are made based on the exemplary individual's income. For example, in 1985, the individual's income has increased to $108,000 and the amount of contributions is adjusted to provide an estimated retirement income equal to the then current salary. As illustrated in years 1985 through 1990, the annual contribution may decrease as a percentage of total income (see % Contribution) as long as total income does not increase too rapidly. However, when a significant raise is achieved and the time period to compensate for such a raise is small, the contribution as a percent of income may increase.

Further, the system 10 may include interface devices, such as input devices or output devices. For example, the system 10 may include an input device, such as a keyboard 16, a mouse, a trackball, a microphone, or other input devices, or any combination thereof. The output device may include, for example, a display 12, a printer, other output devices, or any combination thereof.

Figures 11, 12:
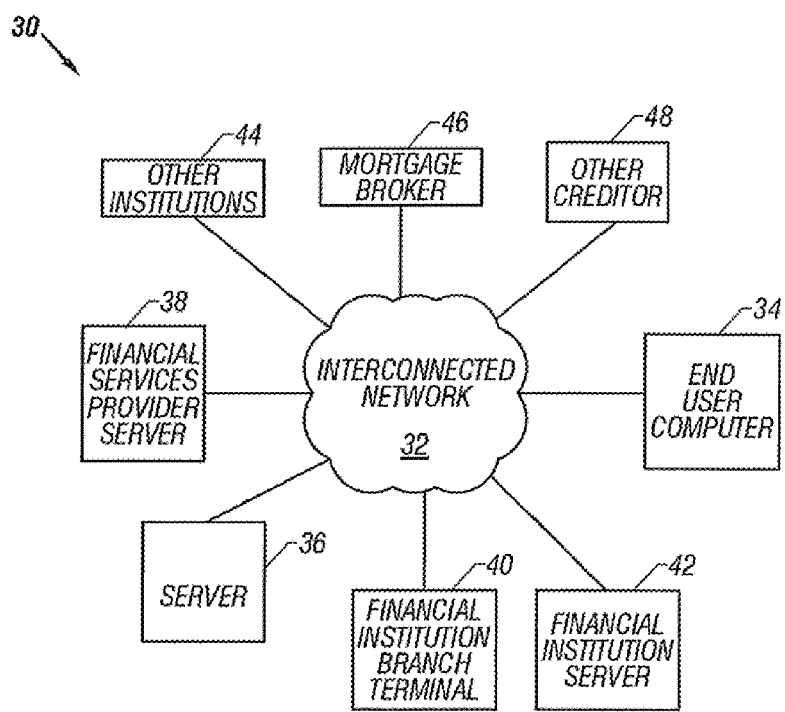
FIG. 11 includes a schematic block diagram depicting a further exemplary embodiment of a system.
FIG. 12 includes a block diagram depicting an exemplary embodiment of a data structure for use in systems, such as the systems illustrated in FIGS. 10 and 11.

FIG. 11 is a schematic block diagram depicting a further exemplary embodiment of a system 30. In this exemplary embodiment, the computational circuitry may be connected to an interconnected network 32. The computational circuitry may take the form of a server 36 or an end user computer 34, for example.

In the case of the server 36, the end user computer 34 may act as a user interface. As such, a user may access the server 36 from the end user computer 34. The access may take the form of a slave-master software relationship, a web-browser, or other interface methods. For example, the user may log-in to the server 36 through an interconnected network 32 with a web browser located on the end user computer 34. The server 36 may interact with the user to gather, collect, determine and display, among others, information associated with the personal finance code, fiscal behaviors, or institutional information.

In the case of the computational circuitry being the end user computer 34, the end user may interact with the computation circuitry or software associated with the computational cir-

TABLE 1

Adjustment of Retirement Contributions Based on Projected Income

|  | 1980 | 1985 | 1990 | 1995 | 2000 | 2005 |
|---|---|---|---|---|---|---|
| Non-401K Income | 70,000 | 95,000 | 113,500 | 142,000 | 157,000 | 175,000 |
| 401K (Annual) | 10,500 | 13,000 | 15,000 | 22,000 | 25,000 |  |
| Total Income | 80,500 | 108,000 | 128,500 | 164,000 | 182,000 | 175,000 |
| Proj. Ret. Income | 77,000 | 108,000 | 128,500 | 165,000 | 183,000 | 175,000 |
| Current IPA | 75,000 | 190,000 | 383,000 | 706,000 | 1,200,000 | 2,200,000 |
| IPA % | 71 | 74 | 72 | 67 | 71 | 72 |
| % Contribution | 13.0 | 12.0 | 11.7 | 13.4 | 13.7 |  |

When the individual is ready for retirement, as illustrated in 2005, the total income is equal to the income acquired through income producing assets. In addition, the individual has an amount of income producing assets relative to other assets and debts (e.g., 72% IPA) that permits sustained growth of income producing assets and thus, income relative to inflation.

Figure 10:
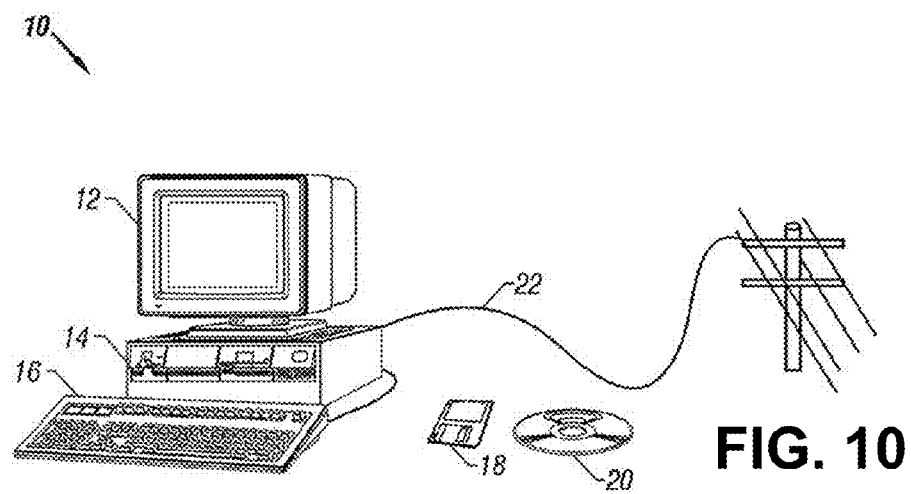
FIG. 10 includes a schematic block diagram depicting an exemplary embodiment of a system.

Turning to the computational systems, FIG. 10 is a schematic block diagram depicting an exemplary embodiment of a system 10. The system 10 may be a computational circuitry, such as a desktop computer 14, as illustrated. Alternatively, the computational circuitry may take the form of a server, a remote computer, a laptop, a smart device, a smart card, a handheld device, a PDA, or other circuitry, or any combination thereof.

Further, the circuitry may or may not be connected to a network 22. The network 22 may be hardwired or wireless. Further, the system 10 may include a medium 18 or 20 readable by the computational circuitry. Such a medium 18 or 20 may store software or a program which incorporates computer operable instructions to implement the method. Such a medium 18 or 20 may, for example, take the form of a floppy disk, CD-ROM, DVD-ROM, CD-R, CD-RW, DVD-R, DVD-RW, flash memory, RAM, ROM, hard drive, or other mediums, or any combination thereof.

cuitry to gather, collect, determine and display, among others, information associated with the personal finance code (PFC), fiscal behaviors, or institutional information. Alternatively, the computational circuitry may be a handheld circuitry, smart phone, smart card and reader, or other device connected to the network. In addition, the system may be configured to include one or more of such devices.

In each case, the system may operate to gather, retrieve, provide, and aggregate information associated with fiscal behavior, asset allocation and evaluation, or the personal finance code. Such information may be used in performing an evaluation of the state of personal finance and projecting the consequence of fiscal behaviors. The information may be acquired from various institutions, banks, trusts, savings and loans, businesses, companies, organizations, or creditors, among others. Such entities may, for example, be servers 42 or branch terminals 40 of financial institutions, banks, savings and loans, mortgage brokers, creditors, financial service providers or other institutions, among others. The information may be transferred, downloaded, retrieved, requested, exchanged, or sent through an interconnected network 32. In a further example, the user computer 34 or server 36 may access financial service provider servers 38, other institutions 44, mortgage brokers 46, or other creditors 48.

For example, an end user may download a transaction statement from a bank or a balance statement from a broker. Such statements, for example, may be used to assess fiscal behavior or asset allocation. Such statements may also be used to show how closely the individual is following the personal finance code.

As above, computational circuitries may access a program or software comprising instructions for implementing one or more methods. The software may operate in association with an operating system. For example, the operating system may be Microsoft Windows 3.0, 95, 98, NT, 2000, CE, ME, or XP. In a further example, the operating system may be UNIX-based, MacOS-based, Palm-based or other. In addition, the software may interact with an interface. The interface may be an interface associated with the operating system, a web-based interface, or other.

Such programs and software may store information in a data structure, temporarily, permanently, for other periods, or any combination of such periods. FIG. 12 is a block diagram depicting an exemplary embodiment of a data structure for use in systems, such as the systems illustrated in FIGS. 10 and 11.

The data structure may, for example, store information associated with a specific transaction type, fiscal behavior category, asset category, asset type, spending category, or other. The data structure may, for example, store one or more values associated with one or more of the actual amount for the previous period, expected amount for the previous period, cumulative actual amount over more than one previous period, cumulative expected amount over more than one previous periods, a balance for the period, or a cumulative balance over more than one previous periods. The data structure may store such amounts, some of the amounts, or none of the amounts. Further, the data structure may store such data in various combinations, configurations, and relationships. Alternatively, some of the data may be determined from other stored data.

Figure 13:
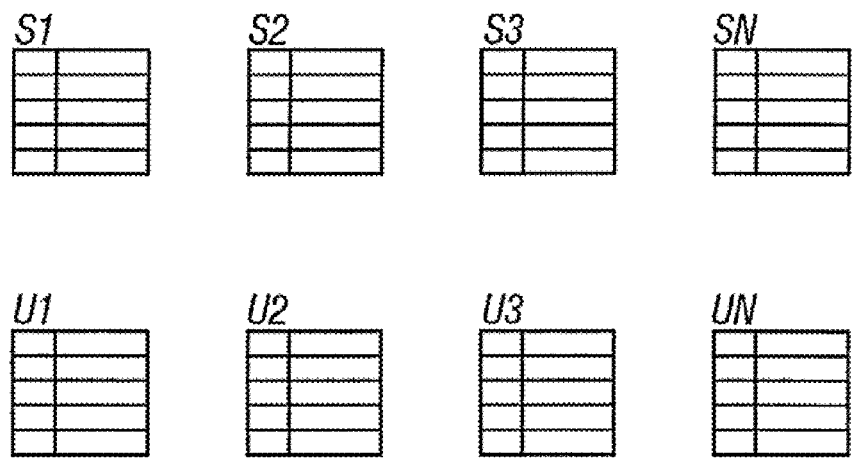
FIG. 13 includes a block diagram depicting an exemplary embodiment of a set of data structures for use in systems, such as the systems illustrated in FIGS. 10 and 11.

Multiple data structures may be used in combination to determine the state of personal finance or determine the effect of fiscal behaviors relative to the personal finance code. FIG. 13 is a block diagram depicting an exemplary embodiment of a set of data structures for use by systems, such as the systems illustrated in FIGS. 10 and 11. More than one data structure or more than one data set held in a data structure type may be used in the system.

For example, one data structure may be used. Several instances of this data structure may be used to represent various income sources, assets classifications, and uses. Alternatively, different data structures may be used to represent assets, income sources, and uses. Further, differing data structures may be used to represent various types within the income sources, assets, and uses. Moreover, any combination of data structure and data may be used.

Alternatively, the data may be held in a database. Such a database may take various forms, including a relational database, object database, or a listing. Further the database may take the form of a Microsoft Jet database, MySQL database, text file, or spreadsheet, among others.

Figure 14:
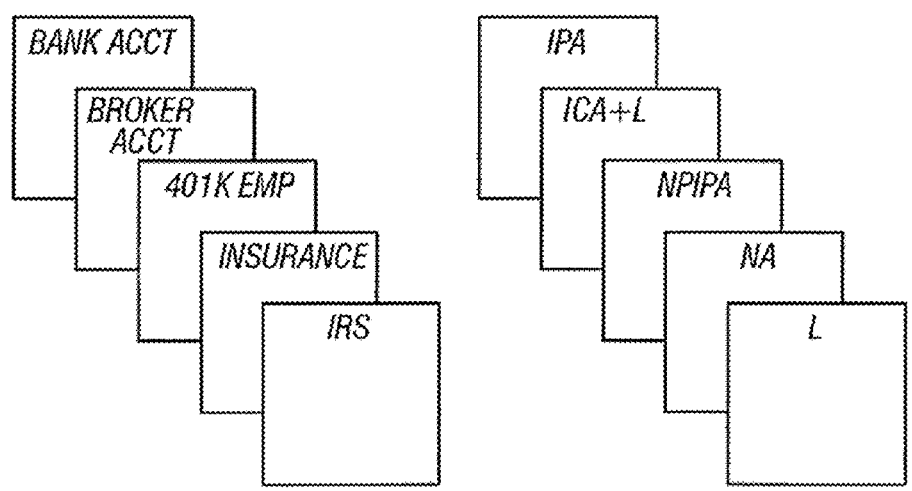
FIG. 14 includes a block diagram depicting a further exemplary embodiment of a set of data structures for use in systems, such as the systems illustrated in FIGS. 10 and 11.

FIG. 14 is a block diagram depicting a further exemplary embodiment of databases storing a set of data structures for use by systems, such as the systems illustrated in FIGS. 10 and 11. As illustrated, the database may hold bank transaction statements, balance statements from brokers, retirement plan statements, or tax statements, among others. From such statements or data, the information associated with fiscal behavior and asset allocation, among others, may be gleaned.

Alternatively, the information from the statements, information downloaded from remote sources, or information acquired from the user may be stored in a pre-categorized form. For example, the assets may be stored in tables associated with the categories IPA, ICA, NPIPA, or NA, among others. Each such data structure may be stored, for example, on a hard drive, floppy drive, CD-R, CD-RW, DVD-R, DVD-RW, removable drive, memory stick, network drive or others.

Figure 15:
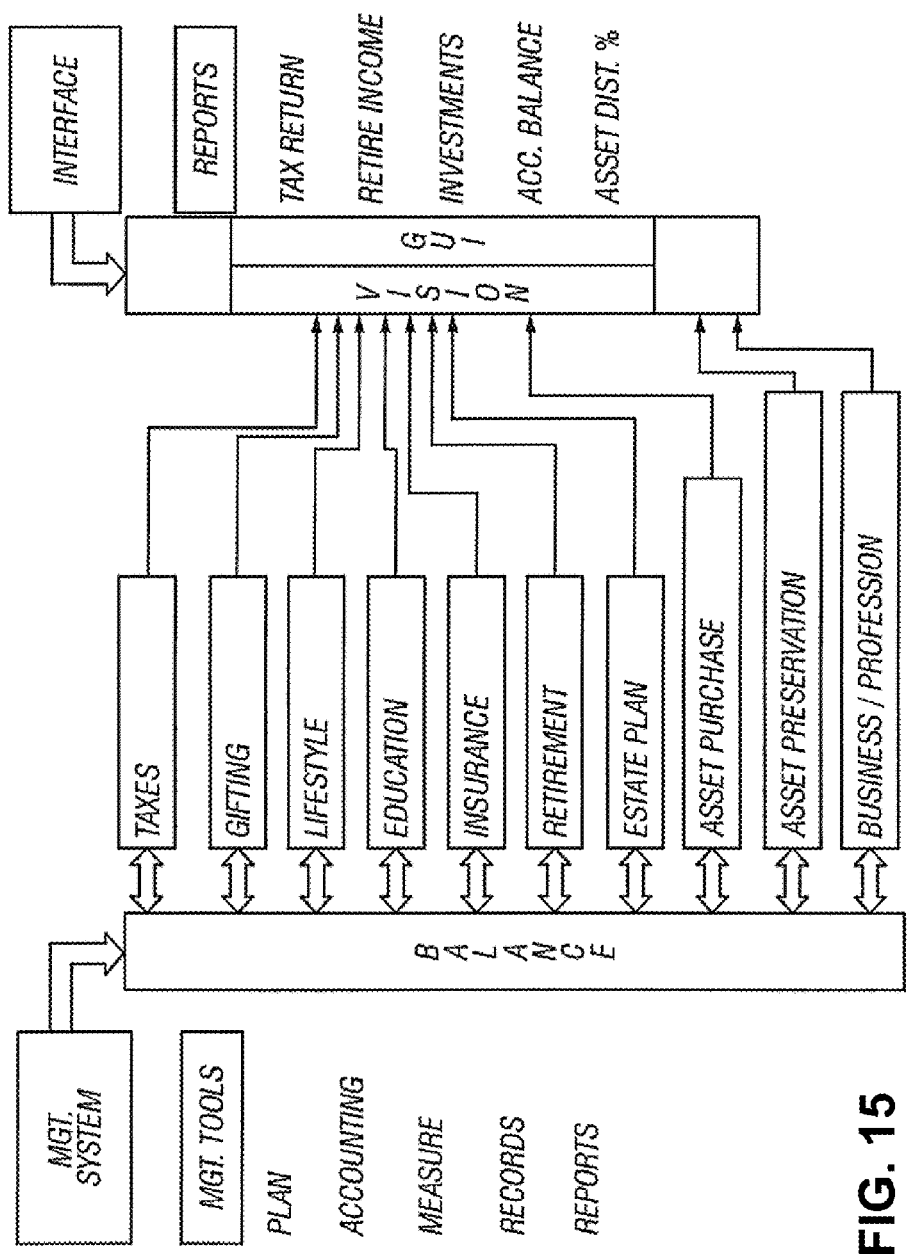
FIG. 15 includes a block flow diagram depicting an exemplary embodiment of a program for use in systems, such as the systems illustrated in FIGS. 10 and 11.

Once the data is acquired, stored, sorted, categorized, or obtained, assessment may be performed. FIG. 15 is a block flow diagram depicting an exemplary embodiment of a program for use in systems, such as the systems illustrated in FIGS. 10 and 11. In this exemplary embodiment, a software module, Balance, may use the information.

Balance may use the information and further categorize or sort it. In addition, Balance may interact with the user to formulate or establish a personal finance code (PFC). Further, Balance may determine budgetary plans and guidelines associated with the PFC. Furthermore, Balance may use the information described above to compare past fiscal behaviors with the budgetary guidelines. Additionally, Balance may compare asset allocations with PFC asset allocation rules. Also, Balance may function to project the effect of possible fiscal decisions on the state of finance given the PFC. As such, Balance may perform the functions associated with determining a present state of personal finances.

In one exemplary embodiment, Balance may employ two models. The first model may be based on a plan or budgetary guidelines that are drawn from the PFC. The first part of PFC may be, for example, a planned source and use of funds in the first year. Another part of PFC may be, for example, a statement or a ratio of assets owned in each of the four asset categories and rate of return expected on income producing assets. The second model may be a model of fiscal behavior. Such models may be expressed together in a set of equations. However, the models may be expressed as separate sets of equations or in various combinations. In particular, the models are constrained models assuming a limited pool of funds.

In a further exemplary embodiment, a projection of the models may be included in Balance. For example, Balance may project the same fiscal behavior over 25 years. In such an example, Balance may also use simple interest to determine the performance of assets. As such, continuing the fiscal behavior and the plan or budgetary guidelines associated with the personal finance code may be compared.

Alternatively, the projection of asset performance may use other models. Such models may have varying complexity. Further, the model of fiscal behavior may take others forms, be time variant, or be adjusted for inflation or other factors. The model of fiscal behavior may have varying complexities. Further, the personal finance code may take various forms.

For example, Balance may account for taxes, gifting, lifestyle, education, insurance, retirement funds, estate planning, asset purchasing, asset preservation, and business or professional income and expenses. The influence of each such factor on the state of personal finance may be projected. Changes in the personal finance code or changes in fiscal behavior in response to such factors may be projected to determine the state of personal finance.

In addition, the data, information, or results of activities associated with Balance may be displayed, reported or provided to the user. For example, the data may be used to aid in filing tax returns. Also, the data, information, or results may be used to create reports associated with asset allocation, performance, distribution and valuations. Further, the data, information, or results may be used to create reports associated with the state of finance, projections, comparisons, comparisons of fiscal behavior and budgetary guidelines, suggested fiscal behavior and or budget changes, and others. In particular, the reports may include a projection of budgetary difference overtime. In another example, the report may include a projection of relative asset allocations. Such reports may be displayed on a screen or monitor or printed.

The output or data of Balance may further be used to assist with tax filings, gifting decisions, lifestyle decisions, planning for education expenses, insurance decisions, retirement decisions, estate planning, asset purchasing decisions, asset preservation decisions, or business/professional decisions, or any combination thereof.

Figure 20:
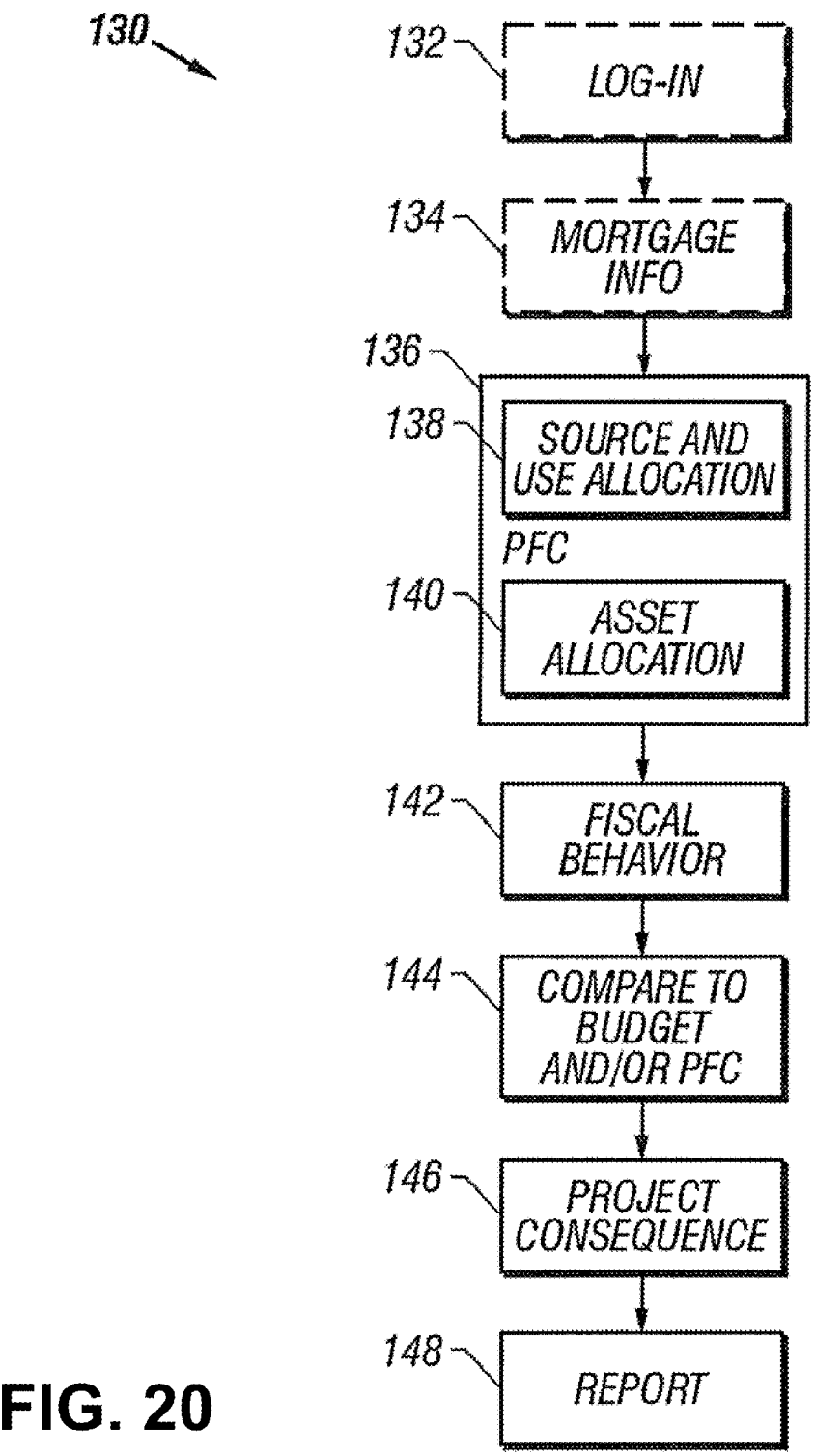
FIG. 20 includes a block flow diagram of an exemplary embodiment of a method.

In an exemplary embodiment of a software product, a user may interact with a computer performing operations listed in the software. FIG. 20 is a block flow diagram depicting an exemplary embodiment of a method.

In the method 130, a user may login or identify himself/herself, as illustrated at 132. However, the system may operate to automatically recognize the user or operate in a single user mode thereby avoiding login.

As illustrated at 134, the user may be prompted for mortgage information. Optionally, entering mortgage information may only be performed on a first execution of the method. Alternatively, the user may or may not be prompted for mortgage information. The mortgage information may be used to determine budgetary guidelines, fiscal behavior, or asset changes, among others.

In addition, the user may enter information relative to a personal finance code (PFC), as illustrated at 136, such as through entering source and use of funds or asset allocations. As illustrated at 138, the user may enter a source and use of funds allocation. An exemplary entry table is depicted in FIG. 21. As illustrated in FIG. 21, the source and use of funds may, for example, be allocated on an annual basis. Optionally, the allocation may be made across a different period, such as monthly or quarterly or such amount calculated based on the annual allocation. The source of funds may include salary, new debt, retirement contributions, asset sales, investment appreciation, or others, or any combination thereof. Additional income may be entered, for example, in the Source cells. There may be one, more than one, or no cells associated with each of the categories above. Further, cells may be included for salaries from more than one job or one or more salaries from a spouse. Multiple source cells may be included. For example, insurance settlements, pension income and social security may be placed in a set of source cells. In addition, multiple cells of new debt may be used. Such cells may include borrowing from credit cards, consumer loans, or others. Further, more than one cell of retirement contributions may be included, representing income derived from a 401K, employer contributions, IRA contributions, or others, for example. Further, multiple cells may be included for the sale of assets. Such cells may include the sale of various categories of assets including IPA, NPIPA, NA, ICA, and others. In addition, cells may be included for the appreciation of assets.

In addition, one or more cells may be included that sum the sources. Further, a cash cell may be included that subtracts the sum of the sources from the sum of the uses.

An entry table may also be used for the use of funds. Such an entry table may include a plurality of cells for various use of funds categories. In addition, the table may include cells for taxes, retirement asset purchasing, mortgage interest, debt repayment, or other asset purchasing. Some, all, or none of the items may have associated cells. Further, such items may have one or more cells associated with various subcategories of the items. In an example, the user may enter an annual allocation and the system may determine a monthly budgetary guideline. Alternatively, the user may make allocations over various time periods.

The uses may include lifestyle expenses, rent, insurance, or other categories. Each use category may be associated with a plurality of cells. Cells may also be allocated to taxes, including federal, state, local, or FICA taxes, among others. Further, cells may be allocated to retirement investments. Such retirement investments may include the purchase of assets. In an exemplary embodiment, the retirement investment cells are equal to or are greater in value to corresponding retirement cells in the source of funds table. Cells may also be allocated to mortgage interest, debt reduction, debt interest, or various categories of asset purchasing.

Further, the use of funds cells may be summed and subtracted from the source of funds to determine a cash balance. In general, the cash balance should be zero as all funds should be allocated.

Turning again to FIG. 20, the user may enter an asset allocation, as illustrated at 140. The asset allocation may allocate assets across asset categories. Further, the asset allocation may establish an anticipated rate of return for the period. The asset allocation and the source and use of funds allocation may be part of a personal finance code, as illustrated at 136.

As illustrated in FIG. 22, a listing of assets in a table may be used. Such a listing may give a present value. Further, an anticipated rate of return may be entered. In addition, a row may be provided that totals the assets and determines an overall rate of return. Moreover, more than one table may be provided. Such tables may list separate categories of assets. Separate tables may be used for each asset type, each individual, or a combination, among others.

Returning to FIG. 20, both of the source and use allocation and the asset allocation may be performed for a shortened period and projected over an extended period. For example, the source and use allocation may be performed in terms of a first year allocation. The first year allocation may then be projected over an expected lifetime or some fiscal horizon, among others. The projection may be, for example, a straight line projection. Alternatively, other projection methods may be used. For example, a method which incorporates a projected growth rate or inflation rate may be used. In addition, the projection may be made in terms of a set of shortened periods. For example, a projection may be made for each year in a set of years. However, other periods may be used. Further, the periods may or may not be uniform.

As illustrated at 142, the actual fiscal behavior is determined. Determining the actual fiscal behavior may be performed through entry of checkbook transactions and other financial transactions. In an example, determining the actual fiscal behavior may be automated. For example, transaction statements may be downloaded from various financial institutions.

As illustrated at 144, the fiscal behavior may be compared with the budgetary guidelines acquired from the source and use of funds allocation and the asset allocation. The comparison may be characterized by a difference in the budgetary guideline and the actual behavior. For example, FIG. 23 depicts a table in which the difference may be determined. In this exemplary table, the estimated and actual fiscal behaviors are listed for a period. Such a period may, for example, be a month in a year or a year in a set of years. The period may take various forms. Further, a row may be allocated for cumulative estimates and cumulative actual behavior. The rows may be summed over the previous periods. Further, the difference may be taken between the cumulative estimates and cumulative actual behavior and placed in a balance cell.

A set of such tables may be used for various spending, source or investment categories. A deficit in one category may result in an excess in another category. For example, an excess automobile expense may result in an increase in a new debt source. In another example, under spending in a food allocation may yield increases in investments. As such, the sources, uses, and asset purchases are linked. Further, the balances display the consequence of the fiscal behavior in an easy to recognize form.

The table may extend over several periods. For example, the table may extend for several months over a year. Deficits in one month may be compensated for by excesses in another month. The year end accumulations may reflect the sum of the behaviors. Further, the table may, for example, extend over several years and show a projection of a cumulative total for future years.

Returning to FIG. 20, the comparison may be used to project a consequence of fiscal behavior relative to the personal finance code, as illustrated at 146. For example, the deficits and excesses in various balances may be used to project the consequence of actions on future fiscal goals. For example, a reduction in savings relative to the budgetary guideline may be projected to yield a reduction in retirement income.

As illustrated at 148, the balances and other calculations and projections may be provided in report forms. Such forms may include a retirement projection. Balances of the fiscal behavior relative to the constraint during the present period and for future periods may be placed in a report. Further, asset allocations may be reported for the past, present, and projected future. Such reports may be displayed or printed.

The projected consequences of actual fiscal behavior relative to the personal finance code provide a state of personal finance. If the projected consequences are small, the state of personal finance is relatively good and the individual has a vision of financial well-being. In contrast, if the projected consequences include large differences between the personal finance code and projected actual behavior, the state of personal finance is poor.

As stated above, business has a profit measure, but the individual does not. The development of a personal financial management system described above produces several measures, among which may be a balance measure, an asset percent measure, and a retirement income measure. For example, a balance statement may record differences in each source and use category in the two models on a cumulative monthly basis. To be on track, a financial category should have a near zero balance. Individual purpose may establish acceptable relationship between the asset types (i.e., an asset percent measure). For example, see FIG. 8. The asset percent statement may record the planned changes in such assets. Again, differences between the two models (the PFC and the fiscal behavior) may record variance from the plan. In addition, individual purpose may, for example, establish the desired annual income for retirement (i.e., a retirement income measure). The retirement statement may illustrate the difference between the two models as monthly financial transactions are recorded.

Optionally, the present methods may be applied to business management. Further, the inventive system and method may be applied to business financial management, such as sole proprietary, partnerships, non-profit organizations, and corporations, among others.

Aspects of the invention may be found in determining one or more budgetary guidelines associated with the personal finance code. Such budgetary guidelines may be further associated with spending categories, or saving and income preferences, among others. In addition, such budgetary guidelines may be associated with a time period or cumulatively tracked balance. Further, such budgetary guidelines may be compared with actual fiscal behavior. The fiscal behavior may include actual spending, income, or savings. Similarly, such fiscal behavior may be associated with a time period.

Additionally, the comparison of the budgetary guidelines and the fiscal behavior may be used to determine a state of personal finance. Such a determination may include, for example, comparing the consequence of the fiscal behavior to a desired asset allocation. In another example, the determination may include projecting the consequences of the fiscal behavior for comparison with the desired monetary amounts associated with future events. One form of such a projection may be to multiply differences between the fiscal behavior and the budgetary guidelines by a number of time periods. Alternatively, the projection may be to sum the differences over a time to determine a cumulative effect.

In addition, the budgetary guidelines and fiscal behaviors may be categorized. Such categories may include income, lifestyle, taxes, gifts, vacations, interest, food, clothing, insurance, automobile, home, utilities, recreation, children, spending, asset purchase, or other sources and uses of funds that are applicable. Further, the individual purpose may include rules associated with asset allocations. Such allocations may be categorized as income producing assets, income consuming assets, non-performing income producing assets, or neutral assets, among others.

Additional aspects may be found in a system for performing the method. The system may have a computational circuitry and a user interface. The computational circuitry may be a laptop, PDA, desktop, or personal computer. Alternatively, the computational circuitry may be a server connected to an interconnected network. Further, the computation circuitry may take the form of other computational devices, such as handheld circuitry, smart devices, or others.

The user interface may have visual and data entry elements. For example, the user interface may be a monitor, keyboard, and mouse with software designed for interaction with such devices. In another example, the user interface may include a printer. In addition, the user interface may include a web browser.

In addition, aspects may be found in the functionality of the computational device. The computational device may interact with the user or other remote data sources to acquire information associated with the personal finance code or fiscal behaviors. For example, a desktop computer may retrieve a bank account registry or a brokerage statement. Alternatively, a server may interact with servers, computers, and terminals of various institutions, among others, to acquire information associated with fiscal behaviors and assets.

Further aspects may be found in a software code for performing the method. Additional aspects may be found in a computer readable medium on which the software code may be stored.

In a particular embodiment, a method for determining a state of personal finances includes establishing a personal finance code. The personal finance code includes amounts associated with a set of sources of income and amounts associated with a set of uses of funds. The personal finance code includes amounts associated with a set of asset categories. The set of asset categories include income producing assets, income consuming assets, and non-producing income producing assets. The method also includes determining a set of guidelines associated with the personal finance code. The set of guidelines is associated with at least one time period. In addition, the method includes deriving a comparison between the set of guidelines and a set of fiscal behaviors. The set of fiscal behaviors is associated with the at least one time period. The method further includes projecting the comparison over at least one subsequent time period to determine a projected effect. The projected effect includes a relative valuation of assets in at least one of the set of asset categories.

In an example, the comparison includes a set of differences between the set of guidelines and the set of fiscal behaviors. In another example, projecting includes multiplying the set of differences by a number of subsequent time periods. In a further example, the amounts are associated with the set of expected sources of income and the amounts associated with the expected uses of funds are based on annual periods. In an additional example, the at least one time period includes a first month. The at least one subsequent time period can include a second month. Alternatively, the at least one subsequent time period can include a subsequent year. The method is implemented in a program of instructions executable by computation circuitry.

In another exemplary embodiment, a method of determining a state of personal finance includes entering a personal finance code into entry tables implemented by software implemented by a computational circuitry. The personal finance code includes amounts associated with a set of expected sources of income and amounts associated with a set of expected uses of funds. The personal finance code includes amounts associated with each asset category of a set of asset categories. The set of asset categories includes income producing assets, income consuming assets, and non-producing income producing assets. The method further includes changing an entry of the entry tables to change an element of the personal finance code. The entry and element is associated with at least one of the amounts associated with the set of expected sources of income, at least one of the amounts associated with the set of expected uses of funds, or an amount associated with one of the asset categories of the set of asset categories. In addition, the method includes projecting a relative valuation of each asset category of the set of asset categories based at least in part on changing the entry using the software implemented by the computational circuitry.

In an example, changing the entry includes changing an entry associated with the at least one of the amounts associated with the set of expected uses funds. In another example, changing the entry includes changing an entry associated with the at least one of the amounts associated with the set of expected sources of income. In an additional example, changing the entry includes changing an entry associated with the at least one amount associated the set of asset categories. In a further example, changing the entry includes changing an entry associated with the amount associated with the one of the asset categories of the set of asset categories.

In a further exemplary embodiment, a computer readable media includes software instructions operable by a processor to implement a method for determining a state of personal finances. The method includes establishing a personal finance code. The personal finance code includes amounts associated with a set of expected sources of income and amounts associated with a set of expected uses of funds. The personal finance code includes amounts associated with a set of asset categories. The set of asset categories includes income producing assets, income consuming assets, and non-producing income producing assets. The method further includes determining a set of budgetary guidelines associated with the personal finance code. The set of budgetary guidelines is associated with at least one time period. In addition, the method includes deriving a comparison between the set of budgetary guidelines and a set of fiscal behaviors. The set of fiscal behaviors is associated with the at least one time period. The method also includes projecting the comparison over at least one subsequent time period to determine a projected effect. The projected effect includes a relative valuation of assets in at least one of the set of asset categories.

In an example, the comparison includes a set of differences between the set of budgetary guidelines and the set of fiscal behaviors. In another example, projecting includes multiplying the set of differences by a number of subsequent time periods. In a further example, the amounts associated with the set of expected sources of income and the amounts associated with the expected uses of funds are based on annual periods. In an additional example, the at least one time period includes a first month. The at least one subsequent time period can include a second month. Alternatively, the at least one subsequent time period can include a subsequent year.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method for determining a state of personal finances, the method comprising:
    electronically establishing on a processor a personal finance code, the personal finance code including amounts associated with a set of sources of income and amounts associated with a set of uses of funds, the personal finance code including amounts associated with a set of asset categories, the set of asset categories including income producing assets, income consuming assets, and non-producing income producing assets;
    electronically determining on a processor a set of guidelines associated with the personal finance code, the set of guidelines associated with at least one time period;
    electronically deriving on a processor a comparison between the set of guidelines and a set of fiscal behaviors, the set of fiscal behaviors associated with the at least one time period; and
    electronically projecting on a processor the comparison over at least one subsequent time period to determine a projected effect, the projected effect including a relative valuation of assets in at least one of the set of asset categories.

2. The method of claim 1, wherein the comparison comprises a set of differences between the set of guidelines and the set of fiscal behaviors.

3. The method of claim 2, wherein projecting comprises multiplying the set of differences by a number of subsequent time periods.

4. The method of claim 1, wherein the amounts associated with the set of expected sources of income and the amounts associated with the expected uses of funds are based on annual periods.

5. The method of claim 4, wherein the at least one time period includes a first month.

6. The method of claim 5, wherein the at least one subsequent time period includes a second month.

7. The method of claim 5, wherein the at least one subsequent time period includes a subsequent year.

8. The method of claim 1, wherein the method is implemented in a program of instructions executable by computation circuitry.

9. The method of claim 1, wherein the set of asset categories further includes neutral assets.

10. A method of determining a state of personal finance, the method comprising:
    electronically entering a personal finance code into entry tables implemented by software implemented by a computational circuitry, the personal finance code including amounts associated with a set of expected sources of income and amounts associated with a set of expected uses of funds, the personal finance code including amounts associated with each asset category of a set of asset categories, the set of asset categories including income producing assets, income consuming assets, and non-producing income producing assets;
    electronically changing an entry of the entry tables to change an element of the personal finance code, the entry and element associated with at least one of the amounts associated with the set of expected sources of income, at least one of the amounts associated with the set of expected uses of funds, or an amount associated with one of the asset categories of the set of asset categories; and
    electronically projecting a relative valuation of each asset category of the set of asset categories based at least in part on changing the entry using the software implemented by the computational circuitry.

11. The method of claim 10, wherein changing the entry includes changing an entry associated with the at least one of the amounts associated with the set of expected uses funds.

12. The method of claim 10, wherein changing the entry includes changing an entry associated with the at least one of the amounts associated with the set of expected sources of income.

13. The method of claim 10, wherein changing the entry includes changing an entry associated with the at least one amount associated the set of asset categories.

14. The method of claim 10, wherein changing the entry includes changing an entry associated with the amount associated with the one of the asset categories of the set of asset categories.

15. The method of claim 10, wherein the set of asset categories further includes neutral assets.

16. A computer readable media comprising software instructions operable by a processor to implement a method for determining a state of personal finances, the method comprising:
    establishing a personal finance code, the personal finance code including amounts associated with a set of expected sources of income and amounts associated with a set of expected uses of funds, the personal finance code including amounts associated with a set of asset categories, the set of asset categories including income producing assets, income consuming assets, and non-producing income producing assets;
    determining a set of budgetary guidelines associated with the personal finance code, the set of budgetary guidelines associated with at least one time period;
    deriving a comparison between the set of budgetary guidelines and a set of fiscal behaviors, the set of fiscal behaviors associated with the at least one time period; and
    projecting the comparison over at least one subsequent time period to determine a projected effect, the projected effect including a relative valuation of assets in at least one of the set of asset categories.

17. The computer readable media of claim 16, wherein the comparison comprises a set of differences between the set of budgetary guidelines and the set of fiscal behaviors.

18. The computer readable media of claim 17, wherein projecting comprises multiplying the set of differences by a number of subsequent time periods.

19. The computer readable media of claim 16, wherein the amounts associated with the set of expected sources of income and the amounts associated with the expected uses of funds are based on annual periods.

20. The computer readable media of claim 19, wherein the at least one time period includes a first month.

21. The computer readable media of claim 20, wherein the at least one subsequent time period includes a second month.

22. The computer readable media of claim 16, wherein the set of asset categories further includes neutral assets.

23. The computer readable media of claim 20, wherein the at least one subsequent time period includes a subsequent year.

* * * * *